(12) United States Patent
Ledet

(10) Patent No.: US 10,248,728 B1
(45) Date of Patent: Apr. 2, 2019

(54) SEARCH AND NOTIFICATION PROCEDURES BASED ON USER HISTORY INFORMATION

(71) Applicant: Open Invention Network LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 750 days.

(21) Appl. No.: 14/582,846

(22) Filed: Dec. 24, 2014

(51) Int. Cl.
 G06F 17/00 (2006.01)
 G06Q 30/00 (2012.01)
 G06F 17/30 (2006.01)
 G06Q 30/06 (2012.01)

(52) U.S. Cl.
 CPC ... G06F 17/30867 (2013.01); G06Q 30/0633 (2013.01)

(58) Field of Classification Search
 CPC .................................................. G06Q 30/00
 See application file for complete search history.

(56) References Cited

U.S. PATENT DOCUMENTS

| | | | |
|---|---|---|---|
| 7,069,271 B1 | 6/2006 | Fadel et al. | |
| 8,086,971 B2 * | 12/2011 | Radivojevic | G06F 1/1626 715/863 |
| 8,401,903 B2 * | 3/2013 | Lerman | G06Q 30/0277 455/414.2 |
| 8,527,347 B2 | 9/2013 | Pulijala et al. | |
| 8,554,626 B2 | 10/2013 | Pulijala et al. | |
| 2003/0050916 A1 * | 3/2003 | Ortega | G06F 3/0482 |
| 2005/0261987 A1 * | 11/2005 | Bezos | G06Q 30/00 705/26.44 |
| 2012/0278317 A1 * | 11/2012 | Spiegel | G06Q 30/02 707/731 |
| 2014/0078318 A1 * | 3/2014 | Alameh | G06F 3/0304 348/207.99 |
| 2014/0188886 A1 * | 7/2014 | Mahaffey | G06F 17/30598 707/740 |
| 2014/0282273 A1 * | 9/2014 | Anderson | G06F 3/017 715/863 |
| 2014/0298672 A1 * | 10/2014 | Straker | H04W 12/06 34/175 |

OTHER PUBLICATIONS

Ruiz, J., Li, Y., & Lank, E. (2011). User-defined motion gestures for mobile interaction. Proceedings of the 2011 Annual Conference on Human Factors in Computing Systems—CHI 11. doi:10.1145/1978942.1978971 (Year: 2011).*

* cited by examiner

Primary Examiner — Abby J Flynn

(57) ABSTRACT

The present application includes various information retrieval and query creation procedures. One example provides receiving at least one first action from a first user device, storing the at least one first action in a first data repository, receiving at least one second action from a second user device, storing the at least one second action in a second data repository, and creating a notification and transmitting the notification to at least one of the first user device and the second user device responsive to receiving at least one of the first user action and the second user action. The result may provide optimized results in subsequent search operations.

20 Claims, 29 Drawing Sheets

| Symbol | Function |
| --- | --- |
| A | Information clicked |
| B | Information served |
| C | Requested Searches |
| D | Groups Joined/Created |
| E | Emails |
| F | Calendar Events |
| G | Surfing History |
| H | Location |
| I | Games |
| J | Video |
| K | GPS |

| Equation | Description |
|---|---|
| K)3 + [A,B,C,D,E,F,G,H,I,J] | GPS local times 3 + other data |
| G)2 + [A,B,C,D,E,F,G,H,I,J] | Surfing History local times 2 + other data |
| (F$_r$ + D$_r$)2 + [A,B,C,E,G,H,I,J,K] | Remote Groups and Calendars x 2 + other data |
| If ([A,B,C,D,E,F,G,H,I,J,K] timestamp <= 5 days) then [A,B,C,D,E,F,G,H,I,J,K]2 | Data x 2 if timestamp is recent |
| G)2 + [A,B,C,D,E,F,G,H,I,J] | Surfing history local x 2 + other data |
| (A + K)2 + (A + E) | Information Clicked + GPS >> Information Clicked + Email |

FIG. 11

| | |
|---|---|
| Audio Equipment | Bicycles |
| Home Purchase | Shopping |
| Running | Ping Pong |
| Guns | Colorado |
| Music | Movies |
| Pools | Wood Working |

| Musical Equipment | | |
|---|---|---|
| Brand | Model | Link |
| Denon | DNP720AE | http://usa.denon.com/us/product/pages/productdetail.aspx?pcatid=avsolutions{denonna}&catid=streamingmedia{denonna}&pid=dnp720ae{denonna} |
| Mirantz | M-CR610 | http://us.marantz.com/us/Products/Pages/ProductDetails.aspx?CatId=WirelessMusicSystems&ProductId=MCR610 |
| Mirantz | NR1403 | http://us.marantz.com/us/Products/Pages/ProductDetails.aspx?CatId=avreceivers&ProductId=NR1403 |
| Mirantz | NR1504 | http://us.marantz.com/us/Products/Pages/ProductDetails.aspx?receiCatId=avreceivers&ProductId=NR1504 |
| Sony | STRDN1040 | http://store.sony.com/7.2-channel-4k-wi-fi-network-a-v-receiver-zid27-STRDN1040/cat-27-catid-All-Speakers-and-Stereo-Components |
| Sony | STR-DN840 | http://store.sony.com/7.2-channel-4k-wi-fi-network-a-v-receiver-zid27-STRDN840/cat-27-catid-Home-Theater |
| Yahama | RX-V475 | http://usa.yamaha.com/products/audio-visual/av-receivers-amps/rx/rx-v475_black_u/?mode=model |
| Yahama | RX-S600 | http://usa.yamaha.com/products/audio-visual/av-receivers-amps/rx/rx-s600_black_u/?mode=model |

Musical Equipment

| | |
|---|---|
| Denon DNP720AE | $339 |
| Mirantz M-CR610 | $449 |
| Mirantz NR1403 | $399 |
| Mirantz NR1504 | $499 |
| Sony STRDN1040 | $649 |
| Sony STR-DN840 | $329 |
| Yahama RX-V475 | $449 |
| Yahama RX-S600 | $649 |

Homes With Media Rooms

| | |
|---|---|
| 916 Kings Ct NE, Atlanta | 1.3m |
| 761 E Morningside Dr NE, Atlanta | 649k |
| 1073 Cumberland Rd NE, Atlanta | 1.25m |
| 410 Golfview Rd NW, Atlanta | 899k |
| 170 Robin Hood Rd NE, Atlanta | 1.6m |
| 2125 Virginia Pl NE, Atlanta | 899k |

SEARCH AND NOTIFICATION PROCEDURES BASED ON USER HISTORY INFORMATION

TECHNICAL FIELD OF THE APPLICATION

This application relates to organization and retrieval of user data and more specifically to identifying user specific data from a data repository and applying the data to subsequent data processing operations for optimized user satisfaction and automated data access operations.

BACKGROUND OF THE APPLICATION

Mobile devices have changed the landscape of information delivery for the informed and casual user of such devices. Data that would ordinarily be unavailable may be made accessible with the proliferation of smartphones in today's market. Having access to data is not always the most optimal solution to data related functions. Applications executing on the smartphones must coordinate with data repositories containing the data in order to achieve useable delivery of information to a user.

Currently, there are many applications that execute on smartphones permitting for data to be delivered that is both useful and abundant in nature. However, the seamless integration of large-scale data from multiple sources is still not being utilized. Also, data is generally not intuitive in nature, but tends to be more of a dump of previously recorded data from a user. In addition, data applications retrieve data upon request from a user and not automatically based on other data retrieving factors.

SUMMARY OF THE APPLICATION

One example embodiment may provide a method that includes retrieving first user data from a memory location, assigning a category to the first user data based on at least one of a memory location of the first user data and a context of the first user data, applying a weight to the first user data based on at least one of the category assigned to the first user data and the memory location, and assigning the weighted first user data to a user interest log.

Another example embodiment may include an apparatus that provides a memory and a processor configured to retrieve first user data from the memory, assign a category to the first user data based on at least one of a memory location of the first user data and a context of the first user data, apply a weight to the first user data based on at least one of the category assigned to the first user data and the memory location, and assign the weighted first user data to a user interest log.

Yet another example embodiment may include a method that includes identifying at least one information source stored in a memory location, parsing at least one word from the at least one information source, assigning a category to the at least one word, and updating a set of current interests to include the category.

Still another example embodiment may include an apparatus that provides a memory, and a processor configured to identify at least one information source stored in a memory location, parse at least one word from the at least one information source, assign a category to the at least one word, and update a set of current interests to include the category.

Yet still another example embodiment may include a method that provides identifying a most recent interest from user device submitted data, searching a database for instances of the most recent interest, creating a new category based on the most recent interest, storing the new category in memory, combining the new category with query search terms and submitting a combined query, receiving combined query results; and creating a modified user interface based on the results of the combined query.

A further embodiment may include an apparatus that provides a memory and a processor configured to identify a most recent interest from user device submitted data, search a database for instances of the most recent interest, create a new category based on the most recent interest, store the new category in the memory, combine the new category with query search terms and submitting a combined query, and a receiver configured to receive combined query results, and the processor is further configured to create a modified user interface based on the results of the combined query.

Yet a further embodiment may include a method including capturing present media content associated with a user device, processing the captured present media content to identify a present location of a user device, retrieving user interests and performing a query based on the user interests and the present location of the user, creating a notification including a nearby facility that is associated with the present location and user interests, and transmitting the notification to the user device.

Yet still a further embodiment may include an apparatus that provides a processor configured to capture present media content associated with a user device, process the captured present media content to identify a present location of a user device, retrieve user interests and perform a query based on the user interests and the present location of the user device, create a notification including a nearby facility that is associated with the present location and user interests, and transmit the notification to the user device.

Yet still further another embodiment may include a method that includes identifying at least one current user interest, applying the at least one user interest to a product query, generating the product query and transmitting the product query to at least one product source, receiving a number of products correlating to the at least one current user interest responsive to the product query being transmitted, and incorporating at least one of the plurality of products into a predefined user interest model.

Other embodiments may provide an apparatus that includes a processor configured to identify at least one current user interest, apply the at least one user interest to a product query, generate the product query and transmit the product query to at least one product source, and a receiver configured to receive a plurality of products correlating to the at least one current user interest responsive to the product query being transmitted, and wherein the processor is further configured to incorporate at least one of the plurality of products into a predefined user interest model.

Yet other embodiments include a method that provides receiving at least one first action from a first user device, storing the at least one first action in a first data repository, receiving at least one second action from a second user device, storing the at least one second action in a second data repository, and creating a notification and transmitting the notification to at least one of the first user device and the second user device responsive to receiving at least one of the first user action and the second user action.

Yet still other embodiments include an apparatus that includes a receiver configured to receive at least one first action from a first user device, and a processor configured to store the at least one first action in a first data repository, and the receiver is also configured to receive at least one second action from a second user device, and the processor is further configured to store the at least one second action in a second data repository, and create a notification and transmitting the notification to at least one of the first user device and the second user device responsive to receiving at least one of the first user action and the second user action.

BRIEF DESCRIPTION OF THE DRAWINGS

FIG. 10 illustrates a legend for certain types of results according to an example embodiment of the present application.

FIG. 11 illustrates a table of weight calculations for certain results according to an example embodiment of the present application.

FIG. 15 illustrates a table of default categories in a data repository according to an example embodiment of the present application.

FIG. 19 illustrates an example table of brand, model and links corresponding to a particular product category according to an example embodiment.

FIG. 20 illustrates an example user interface with a modified product sub-category corresponding to the original category created according to example embodiments.

FIG. 21 illustrates another example user interface with a customized product category corresponding to recent user interests submitted according to example embodiments.

DETAILED DESCRIPTION OF THE APPLICATION

Figure 1:
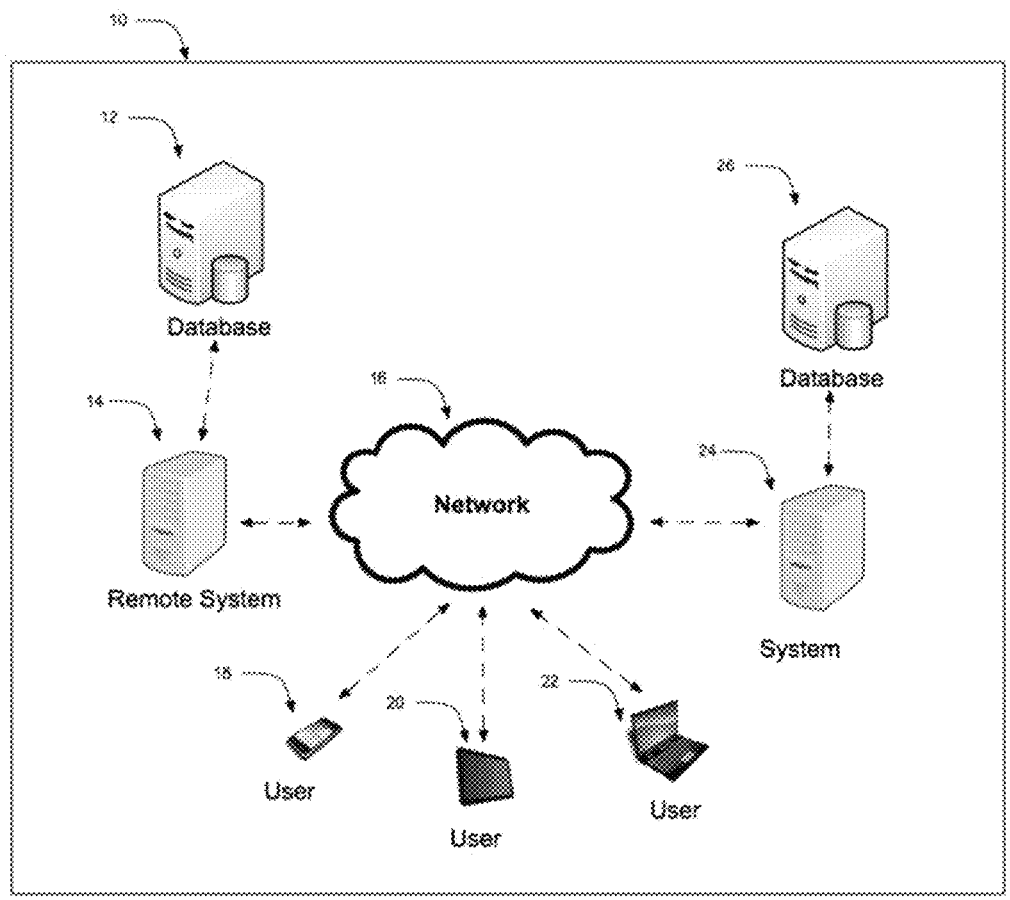
FIG. 1 illustrates a system diagram according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments of the present application permit for the remote storing of data from multiple devices that may be utilized by a single user or group of users. The data is not only stored but is also intuitively managed by the data management application. Examples included in this application provide for the intuitive processing and delivery of the data to the user.

In another example, the present application generally includes the collaboration of data which is stored at a location so an application utilizing data management logic, determines the idea(s) or concept(s) behind the data and offers suggestions related to the idea based on the context or disposition of the data. For instance, as a user uploads data through the application and/or as the application itself uploads data autonomously, such data is stored locally and/or remotely. The application utilizes logic, which is explained below, that permits it to act upon the data, make recommendations related to the data and/or provide the user device with additional information which may result in new opportunities for managing the data, removing the data, etc.

The present application, in one embodiment, generally includes the collaboration of data that is stored at a location so the data management application utilizing logic of the current application determines the idea(s) or concept(s) behind the data and offers suggestions related to the idea including when the data originates from a wearable device (e.g., watch, wristband, eyewear, etc.). More specifically, as a user's device receives image data from a wearable device, the image is analyzed and interactions with local and remote databases provide intuitive input that the user may find useful. The application may then permit for interactions that are seemingly unrelated to previous assumptions and actions, as the information is not requested. Previous interests from past actions are also utilized to ascertain interests that pertain to businesses nearby geographically to where the user device is currently located.

In another example, data collaboration may be performed to include storing data at a location and having a data application of the current application determines the idea(s) and/or concept(s) behind the data and generate suggestions related to the idea. The data may be stored in data repositories that are merged with other repositories in order to notify the user of the user device with information that may be found useful based on previous actions and other criteria. The users' personal data is also utilized to make informed recommendations. Items that are stored in the data repositories may be dynamically ranked according to the activity of the users within the application. Also, recommendations may be made to the user that may offer assistance in selling products that are being replaced.

FIG. 1 illustrates a system network diagram according to an example embodiment of the present application. Referring to FIG. 1, the network diagram 10 of the present application may permit a user utilizing a mobile client machine 18, a tablet computer 20, a laptop or desktop computer 22 to download data and application data from the system server 24 over the network 16. The client's device may also be a gaming device, a DVD player, or any other device that is normally used to access media.

The computing device 18/20/22 is connected to the network 16, which may be the Internet or any other type of communication network through wired or wireless communication. It should be noted that other types of devices, in addition to devices 18/20/22, might be used with the example embodiments of the present application. For example, a PDA device, an MP3 player device and/or any other wireless device including a gaming device, such as a hand-held device or home-based device and the like including a P.C. or other wired device that can also transmit and receive information could be used with the embodiments of the present application.

The user of the application can interface with the client device 18/20/22 and connect through the network 16 to the system server 24. The system server 24 can be redundant or may be more than a single entity without deviating from the scope of the application. A database or database server 26 may be directly connected to the system 24 or connected remotely through the network 16 without deviating from the scope of the application.

In operation, a remote system server 14 communicates with the network 16. The remote system 14 can be redundant and/or may be more than a single entity device without deviating from the scope of the application. A database 12 is directly connected to the remote system server 14 or may be connected remotely through the network 16 without deviating from the scope of the application. The user-database can reside in the system server 24 or the database 26 either directly connected to the system 24 or remotely through the network 16.

The application of the current application resides completely or partially on the user's device 18/20/22, which can be a mobile device, but can also reside on a user's desktop computer, a personal digital assistant (PDA), tablet computer, or any other device containing a processor, memory, and an operating system. In addition, the software application of the current application can reside on either completely or partially on any one of the other elements in the system 10 depicted in FIG. 1, for example, the system server 24, the database server 26, the remote system server 14, the database server 12, and/or the network 16. If the software application of the current application resides on a device, the application may be downloaded through a platform, such as an application store or virtual market residing on the device or accessed via the device, or may be accessed through the device's browser communicably coupled to the network 16. Further, the application of the current application can be pre-loaded on the device.

Figure 2:
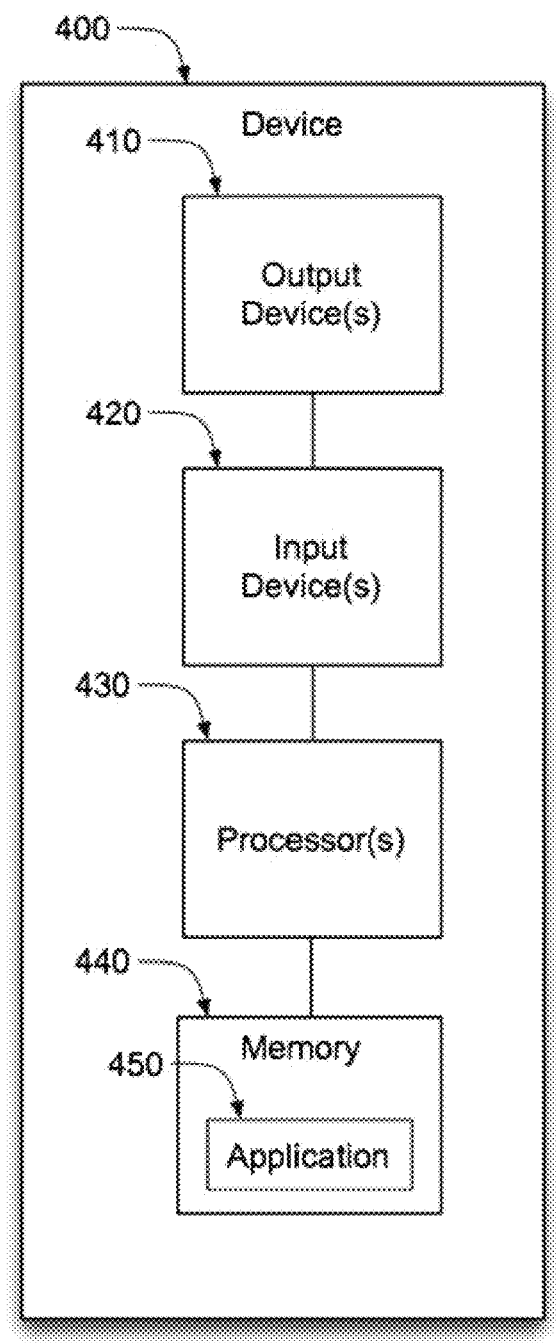
FIG. 2 illustrates a device application workflow diagram according to an example embodiment of the present application.

FIG. 2 illustrates a device application workflow diagram according to an example embodiment of the present application. Referring to FIG. 2, the device 400 is illustrates as having the application 450 installed. The device 400 can contain one or more of an output device 410, such as a display screen, audio output and the like, an input device 420 such as a keyboard or mouse or microphone, retinal scan and the like, processor(s) 430, and memory module(s) 450. The application 450 can reside in a memory module 440. It should be noted that output device(s) 410 and input device(s) 420 can each be directly coupled to or communicably coupled to the processor(s) 430 and/or the memory (440). Further, additional memories (not shown) can be located in the device based on other embodiments.

The current description of user interaction relating to the specific modes of input including but not limited to touch, voice, gesture and eye movement serve as examples of data input to manipulate and perform selections within the application. The user interactions can relate to other modes of operation or other user interactions can also relate to the various modes of operation without deviating from the scope of the current application.

The application 450 resides on the device 18/20/22 and either reside on the device natively, existing on the device upon initialization such as, for example, on the device's memory 440 and/or may be downloaded from the network 16. In one example embodiment, the application 450 is operating on the device 400. The application may utilize an option to execute upon startup of the device 400. When this option is selected, upon device initialization, the application 450 is initiated and is operating continuously in the background of the device's operating system.

The main functionality of the application is the storing of the data in one or more locations, which may be referred to as data repositories. The data repository can be a folder, or other structure that can store information, stored on the device 450 and/or in a remote location. If the data repository is on the local device 400, the data can be stored in the storage location or the memory 440 of the device 400. The operating system of the device 400 has one or more application programming interfaces (APIs). In one embodiment, the APIs permit the storing of data onto the device's storage location. This storage location can be either the device's internal memory or on an attached memory card connected to the device 400. If the data repository is in a remote location, the application 450 interfaces with a storage location that can be accessed from the network 16, the system server 14/24, the database 12/26, and/or any other location where an application 450 executing on a device 18/20/22 normally stores data.

Figure 3:
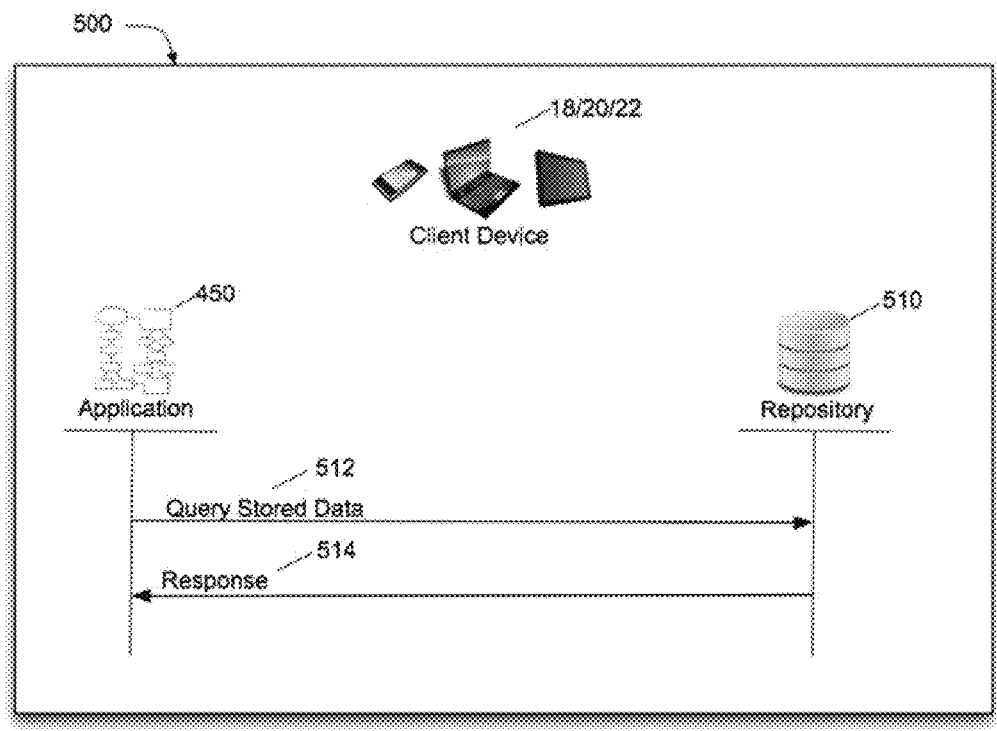
FIG. 3 illustrates a system communication diagram of accessing a data repository internally according to an example embodiment of the present application.

FIG. 3 illustrates a system communication diagram of accessing a data repository internally according to an example embodiment of the present application. Referring to FIG. 3, the diagram representation 500 illustrates the operation of the data repository located inside the client device 18/20/22. In this example, the application 450, operating inside the client device 18/20/22 communicates with the data repository 510. The repository 510 is also locally contained in the client device 18/20/22. The application 450 can request data from the repository 510 by querying the data. The communication between the application 450 and the repository 510 may occur utilizing a database protocol such as the structured query language (SQL). A "Query Stored Data" message 512 may be sent to the Repository 510 when the application 450 is attempting to gain access to the stored data. In response, a "Response" message 514 is returned to the application 450 which may indicate a successful result, a failed result or may be a request for additional information depending on the type of query.

Figure 4:
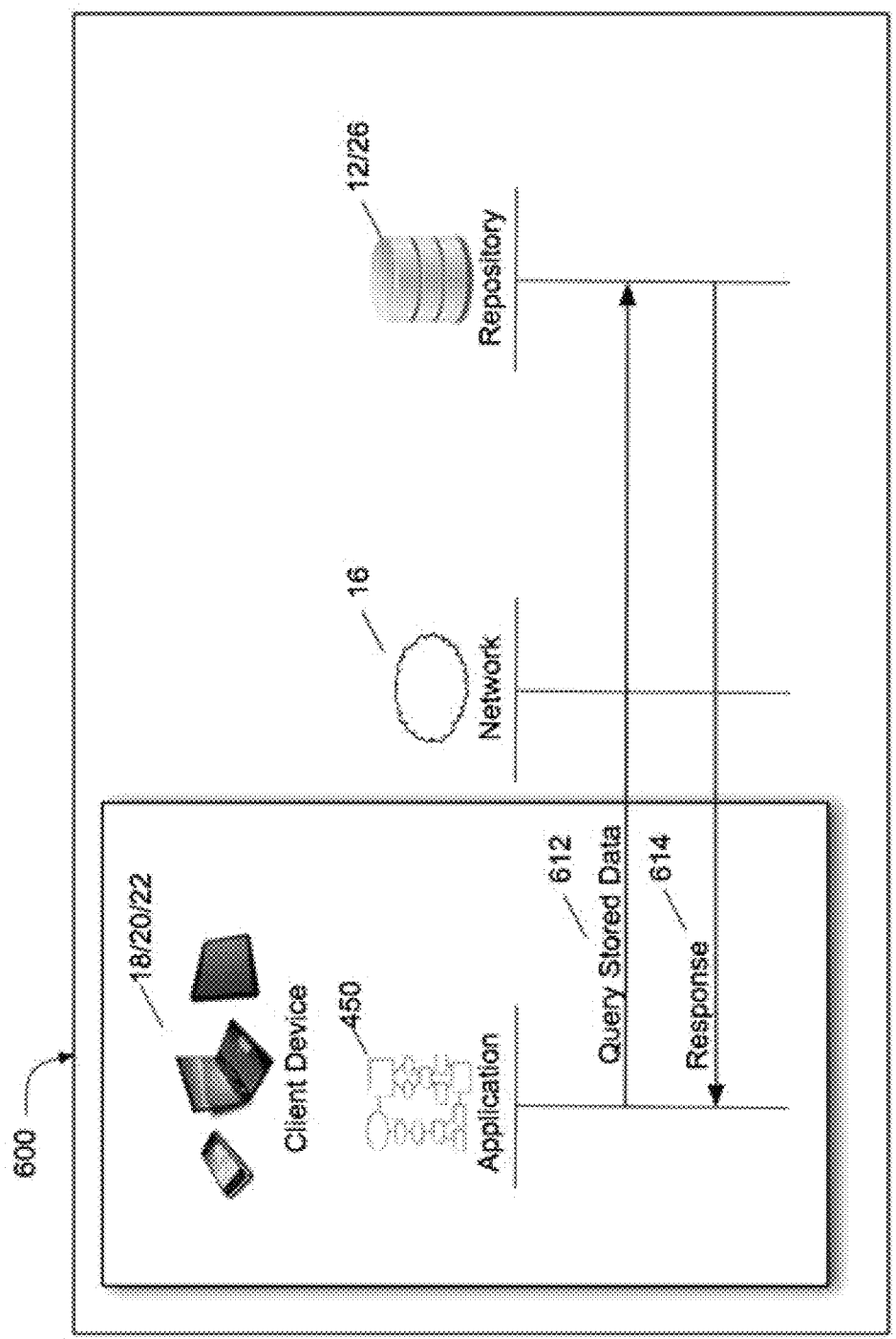
FIG. 4 illustrates a system communication diagram of accessing a data repository externally according to an example embodiment of the present application.

FIG. 4 illustrates a system communication diagram of accessing a data repository externally according to an example embodiment of the present application. Referring to FIG. 4, in this example the diagram 600 depicts the data repository being located outside the client device 18/20/22. In this depiction, the application 450, located inside the client device 18/20/22 is the application executing on the device. The repository 12/26 is located in a remote location accessed through the network 16, which may be the Internet, an intranet, and/or any network that can accept and/or provide data.

The application 450 can request data from the repository 12/26 by querying the data. The communication between the application 450 and the repository 12/26 may occur utilizing a database protocol, such as the structured query language (SQL). A "Query Stored Data" message 612 may be sent to the data repository 12/26 when the application 450 desires to access the stored data. In response, a "Response" message 614 is returned to the application 450.

Examples of the types of data that can be stored can be any of a data file, an image file, a video file, a multimedia file or any other type of data normally viewed and/or accessed on a device with a processor and memory. For example, the user may take a picture on the device 18/20/22 and the image can be stored in the device's memory. This memory can be read access memory (RAM), read only memory (ROM) or memory on a more permanent drive, such as the device's internal drive or a connected memory card. As another example, the user may be browsing the Internet on the device's Internet browser. This browser may be the native Internet browser, or another browser downloaded by the device. While browsing, the user may initiate the data upload functionality, for example by touching the icon on the tool bar, speaking commands that are interpreted by the application 450 to initiate an upload, or providing a gesture that also initiates a data upload. The uniform resource locator (URL) is then stored in the repository by the application 450.

As another example, the user may be browsing files located on either the device's memory 440 or in a remote location such as the network 16. Upon selecting or highlighting a file, the user initiates a data upload in a similar fashion as described above and either a reference to the file or the actual file is then stored in the device's repository. The data received by the user is stored in a repository. This data repository can be located in the client device 18/20/22, in the cloud or a database located in the Network 16. In one example embodiment, the data stored in the client device 18/20/22 is also located in the cloud, or the network 16. This implementation permits for each device used by the user to have access to all data stored in each of the respective client devices 18/20/22.

Figure 5:
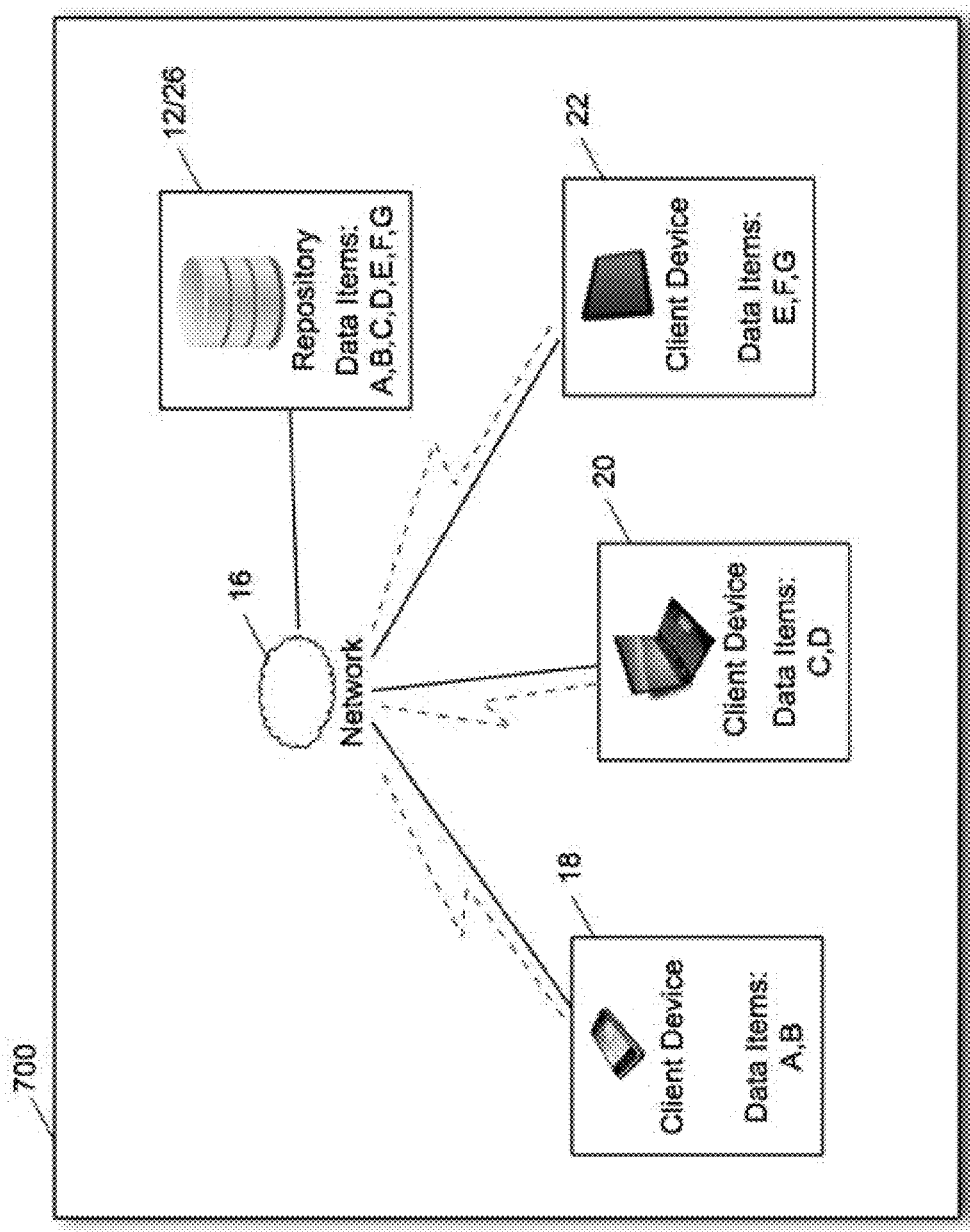
FIG. 5 illustrates a network diagram of storing data across multiple client devices according to an example embodiment of the present application.

FIG. 5 illustrates a network diagram of storing data across multiple client devices according to an example embodiment of the present application. Referring to FIG. 5, storing data across multiple client devices may be performed for various reasons. In FIG. 5, the implementation 700 provides for storing data across multiple client devices 18/20/22. In this example embodiment, the client devices 18/20/22 communicate with the network 16 through one of more of wired and wireless mediums. The repository 12/26 is communicably coupled to the network 16. The repository 12/26 can be a separate database that stands alone or which is part of another database. The repository 12/26 can also be communicably coupled to a system server 14/24 with is communicably coupled to the network 16. The repository can also be located in one or more of the other network elements depicted including the network 16, the database(s) 12/26, the remote system server 14, the system server 24, the client devices 18/20/22, and/or any element with a processor and memory without deviating from the scope of the current application.

Continuing with the example of FIG. 5, the client device 18 has stored data items A and B. Those data items have been stored by the application 450 executing on the device 18. The client device 20 has stored data items C and D, and client device 22 has stored data items E, F and G. These items have been stored by the application 450 executing on the respective devices.

In another example, the application 450 resides not in the client devices 18/20/22, but in the data repository 12/26. The application 450 may be accessed by the client device 18/20/22 via a portal, a link, or other mechanism that permits communication with the application 450. For example, an icon present on the display of the client device 18/20/22 may provide a link or connection to the application 450, which resides in a remote location, such as the cloud. The communication between the client device 18/20/22 and the application 450 is routed through the network 16.

In another example, the application 450 may be distributed across many devices communicating across the network 16, the data repository 12/26 or any device communicably or non-communicably coupled to the client device 18/20/22 through the cloud. For example, a portion of the application 450 may be present on the user device (i.e., 15%) and the other portions of the application required for execution may be present in a remote device or the cloud.

The data repository 12/26 includes all of the data items stored (A, B, C, D, E, F and G). Those items have been stored by the application 450 executing on the client device(s) 18/20/22 through operations generally used to store data items in a data repository. For example, a structured query language (SQL) query can be performed by the application 450 executing on the client device(s) 18/20/22, and the query message is sent from the client device(s) 18/20/22 to the network 16 and routed to the data repository 12/26 where the data is stored in the data repository, for example a database located in the data repository 12/26.

In another example, an icon is overlaid on the display of the device and is activated through the user's pointing device. This pointing device may be the user's finger, or a stylus normally used to interact with the device 18/20/22. The icon is a button that, when pressed, permits for certain functionality to be executed. In another embodiment, there exists an icon on the toolbar existing on the device 18/20/22. This toolbar may be part of the operating system of the device, implemented as an overlay for example, or be implemented in the application 450. If the toolbar is part of the operating system of the device, then it is available at all times regardless of the executing program of the device. If the toolbar is part of the application, then it is available when the application is executing on the device. The toolbar has an added icon that, when pressed executes functionality of the application 450. If the toolbar is not part of the application 450, then the pressing of the icon by the user's pointing device may initiate the start of the functionality of the application 450.

The user may initiate the functionality of the application 450. The user is able to use any method commonly used to initiate functionality, including touch, speech, and gestures. For example, the application may permit the user to perform a drag-and-drop gesture so the user may drag a component, for example, an image, file, document, etc. over the icon and release the component which is then identified as input to the application 450.

In another example, a speech component permits the user to speak a word or series of words so the device 18/20/22 determines as a command word(s) and the application 450 receives the selected component as input. This command can be configured or reconfigured in a configuration component of the application 450. The application icon may or may not appear in the speech component. For example, the user can select a component on the device's display and speak a command such as "drop". The command would be interpreted by the application 450 and stored as a selected component into the data repository(s) 510, 12/26. The specific category can also be provided permitting the data to be placed in the spoken category in the repository(s) 510, 12/26.

Using application program interfaces (APIs), the application 450 utilizes facial and body gestures to interpret commands for the application. For example, a facial recognition tool, such as FACEMARK may be used as an API for facial feature detection. Such an application identifies 68 points for a frontal face and 35 for a profile face. FACEMARK detects landmarks for faces on the image specified by the URL or uploaded as a file and produces Javascript object notation (JSON) output containing a vector of facial landmarks and orientation for each face identified. FACEMARK and many other APIs currently available permit the device to recognize and interpret facial and body gestures.

Other body movement gestures are also permitted as user input. For example, the user not speaking but simply moving his/her lips would be received and interpreted by the device as a command from the non-verbal words being delivered. This example also includes the scenario where the user is not able to speak (i.e. a classroom or a quiet area). The user is still able to enter commands without vocalizing commands via facial movements or lip-synching. Certain devices have implemented a type of gesture called an "Air Gesture" that implements an infrared sensor to process user movements in front of the device display, adding a "pre-touch"/"proximity" event, in which the fingers are detected before the touch. Utilizing similar functionality, other types of movements can be implemented to interwork the gestures used as input.

In operation, once a gesture is received, the application can ignore all other gestures until a pre-determined event (i.e., the end of the song or file being played). This functionality permits the user to provide gestures that are interpreted by the application without worrying about the application receiving other non-intentional gestures. Certain gestures can be designed to overcome the current state. For example, once a gesture is received, all other gestures are ignored until a determined time except for an overriding gesture. For example, if the user performs a particular gesture such as raising his/her shoulders, the overriding gesture would then permit the next gesture to be received as input. This functionality permits for intuitive interaction while providing the user with the ability to easily interact with the application by performing gestures that are natural in nature. These input gestures can be interworked with many types of devices, for example televisions, gaming systems or any type of device which may or may not contain one or more of a processor, memory, input and outputs and a display.

The user is able to define the relationship between the gesture(s) and the associated action in the configuration part of the application 450. The configuration component of the application 450 permits both the definition of the gestures as well as the reconfiguration of the gestures. In another embodiment, the gestures may be preloaded by the application 450 so a predetermined gesture/action relationship is loaded at run-time. The gesture definitions are normally utilized gesture definitions from ones that are normally used by other users of the application. In another example, the user is able to record new gestures so the device 400 utilizes either a front-facing camera or a rear-facing camera on the device to record the gesture, and the associated actions are assigned to the recorded gesture by the user. The gesture may also be recorded by the device's microphone permitting not a particular gesture, but instead a voice input.

In another example, the gesture is based on the user's movement associated with the action. The device, using the camera(s) on the device 400 will recognize the normal gestures of the user and may suggest other gestures even those that the user may have not thought of to be utilized as gestures to include in the gesture definitions of the application 450. For example, the user may press anywhere on the display of the device as a first input type or first gesture movement, while moving the head toward the left, right, forward or backward as a second gesture movement. In one example, the user may press on the screen and then lean or move their head to the right to signify to the application that the user wishes to fast-forward the playing video a predetermined amount of time. Also, while pressing the display, the user may move their head toward the left to signify rewinding of the playing video for a predetermined amount of time. The touching of the device permits the application to become aware of an impending gesture and to prepare for that incoming data. This functionality permits the user to not worry about providing input to the application that is not desired. Also, during the assignment of a gesture/action in the configuration component of the application 450, the device may identify that the user may use the assigned gesture too often and notify the user of this discrepancy and provide a suggestion for another gesture that provides for a more natural gesture to be utilized in place of the default gesture, or select a gesture in the configuration component.

In another embodiment, the application attempts to determine the user's personal interests. Understanding the current and past interests of the user aids the application 450 to store and delete the received data at a more granular level, which in turn, characterizes the stored data in accordance with an organizational procedure that the user can understand during data access and data retrieval operations. The interests of the user may be determined by examining any or all of information that has been provided to the user, for example, when the user is online and accessing data from remote sources, information such as advertisements, that the user has previously selected (i.e., clicked, hovered, requested, etc.), search queries requested, groups the user has membership, emails that the user sent or received, calendar events, historical Internet search habits, current location of the user/user's device(s), previous locations of the user/user's device(s), online games/apps that the user has played/utilized, mobile games/apps that the user has played/utilized, digital video recordings (DVR) programs stored by the user, live video streaming/Internet protocol television (IPTV), web based shows, TV based shows, radio/music platforms/music applications/music players, GPS information, and cellular/mobile device equipment and usage.

One example may include accessing the online search history data of the user's online Internet access via the user's device. All web browsers retain Internet surfing information in the form of files stored on the user's device. These files can be scanned to determine information that can aid the application in understanding the interests of the user. Other procedures can be employed to gain an understanding of the user's previous Internet surfing history. GOOGLE and YAHOO, for instance, offer free services that users can utilize to perform email capabilities, manage groups, search the web, manage information, such as advertisements, manage calendar activities, manage documents as well as many other services. Data associated with these services can be interworked with the current application to aid in understanding the interests of the user. Unlike conventional approaches to understanding user behavior, the current application provides the ability to understand the interests of the user based on information that has historically appeared in association with the user's information.

In another embodiment of the current application, the application can continue to monitor the user's information, independent of any user input, and provide updates to the search results reflecting changes to the user's information, for instance, the location of the user, or new user interests. In another embodiment of the current application, the user's data results from the user's local device 18/20/22 (i.e., tracking files) can be weighed against the user's data results returned from the system server 14/24 and a weighing algorithm may be utilized to determine the priority of the data results. When obtaining the user's data, the latest data with the most current timestamp ($T_{recent}$) can be given a higher weight than older data ($T_{previous}$).

Figure 6:
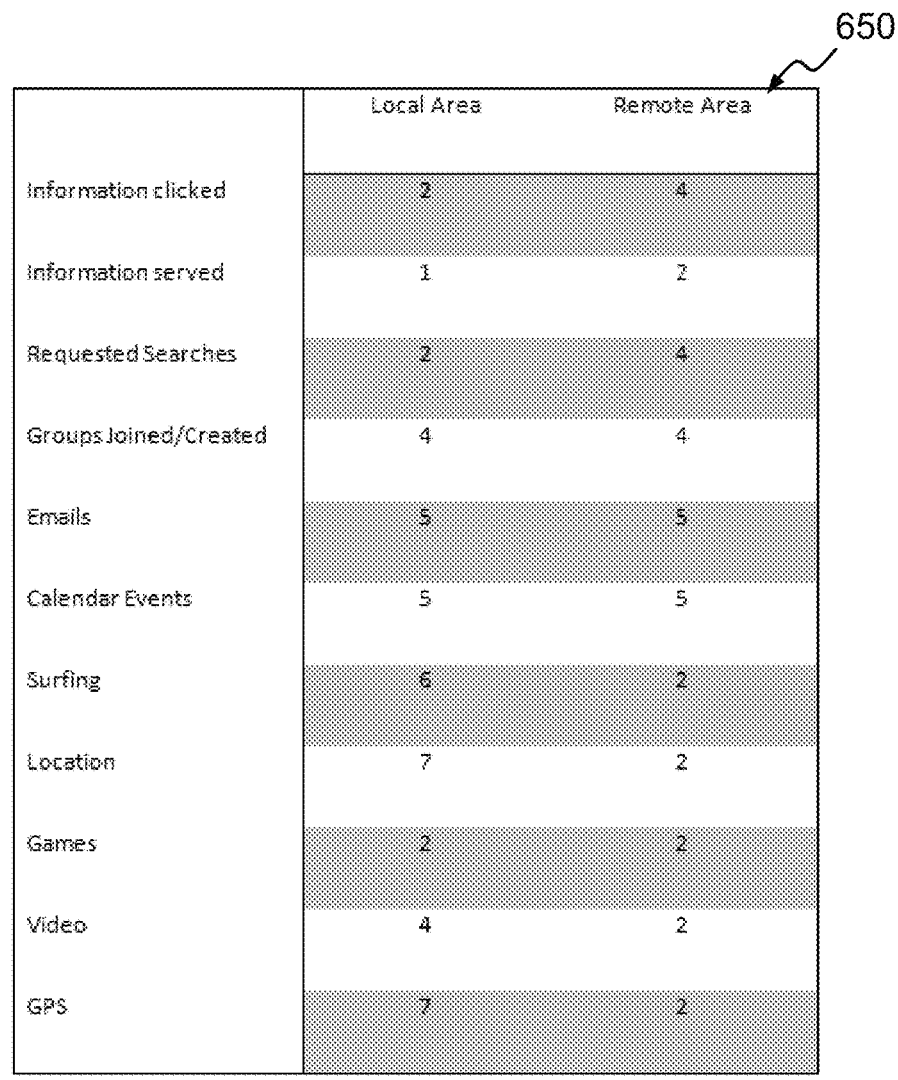
FIG. 6 illustrates a table of weights for local and remote area data according to an example embodiment of the present application.

FIG. 6 illustrates a table of weights for local and remote area data according to an example embodiment of the present application. Referring to FIG. 6, the table 650 demonstrates a weighing algorithm that can be utilized to determine which data is most useful for determining the user's interests. For example, the possible weights assigned for each category of the user's interests. Weights are assigned according to the validity of the information found in that area. The location of the user may be determined by the IP address of the user device or determined via GPS data which would be more accurate when obtained from the local area. For calendar events the weight may be the same since it is unknown whether the user uses an online calendar or a calendar that is only local to the user's device 18/20/22. Both areas may contain data from the user's current calendar, and thus those areas would be assigned the same weight. The user's Internet search history would have a higher weight from the local device 18/20/22 since this is where the most up-to-date search history is available. The weighting in FIG. 6 is an example of weighing that can be incorporated into the application. Any other weighing algorithm can be utilized without deviating from the scope of the current application.

When results are received from both the local device 18/20/22 local area and local memory and remote systems 14/24 remote area and remote memory, the table of FIG. 6 aids in determining the origin of the data, the priority of the data and weighting the data. As may be observed, both emails and calendar events may have the same weight for both the local device 18/20/22 and the remote system memories 14/24. If data is received from both areas, the data with the latest timestamp can be utilized in the application or weighted more than an older timestamp portion of data. Examples of the weights and categories include: information clicked 6, information served 3, requested searches 6, groups joined/created 8, emails 10, calendar events 10, surfing 8, location 9, games 4, video 6 and GPS 9.

Figure 7:
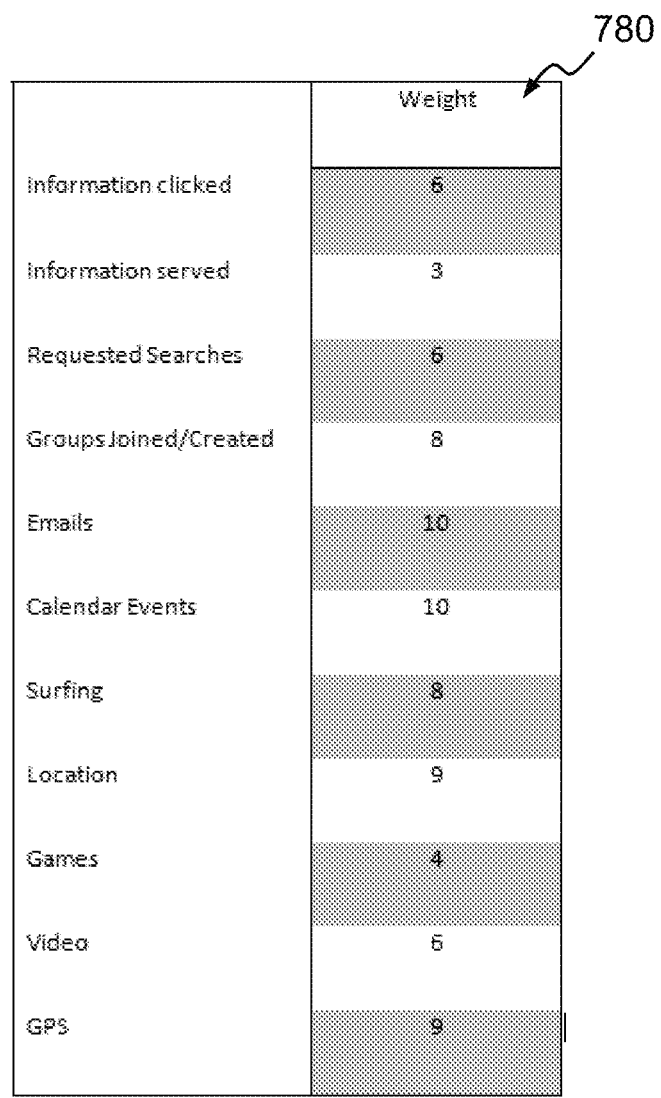
FIG. 7 illustrates a table of weights for prioritizing result according to an example embodiment of the present application.

FIG. 7 illustrates a table of weights for prioritizing data results according to an example embodiment of the present application. Referring to FIG. 7, the weights 780 assigned to the data results include a priority of the results which is associated with the value assigned to that particular result in the examples of FIG. 6. The weight assigned in FIG. 7 is calculated by adding the two values from the two memory locations in FIG. 6 for each row. For instance, when the results are weighted, both emails and calendar events have a higher weight than other results, as both emails and calendar events are usually two of the higher utilized applications daily, and would thus contain the most up-to-date data, or data reflecting the current "intentions" of the user.

Figure 8:
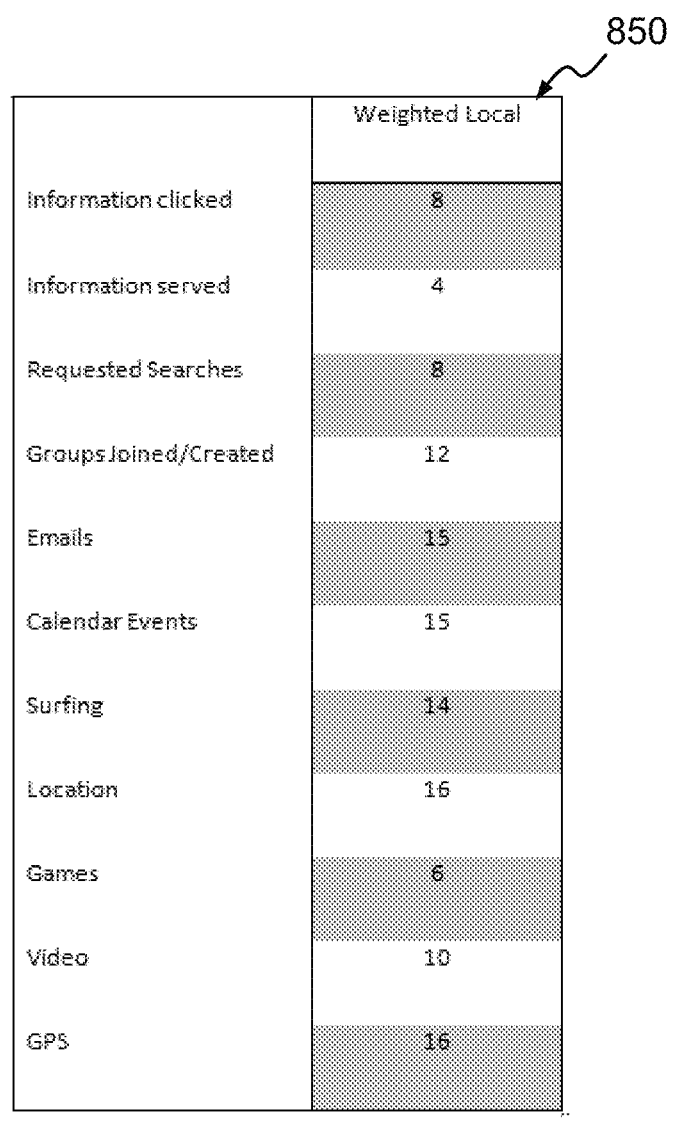
FIG. 8 illustrates a table of weights for priority to a local device according to an example embodiment of the present application.

FIG. 8 illustrates a table of weights 850 for priority to a local device according to an example embodiment of the present application. Referring to FIG. 8, in this example the weights and the results are based on the original values from FIG. 6 and are calculated as follows: Local Weights×2+Remote Weights=Applied Weight. This example expression weights the results from the local device 18/20/22 as being twice as high as the weights of the results from the remote system(s) 14/24. Any other multiplier or weighing algorithm can be utilized without deviating from the scope of the current application.

Figure 9:
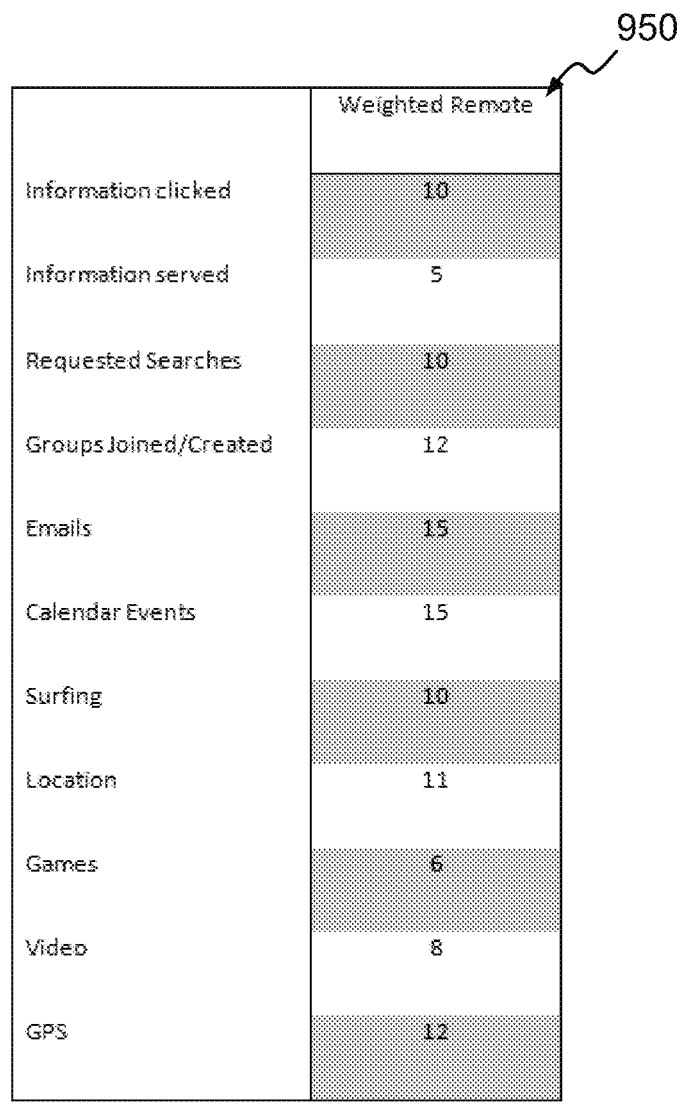
FIG. 9 illustrates a table of weights for priority to a remote system according to an example embodiment of the present application.

FIG. 9 illustrates a table 950 of weights for priority to a remote system according to an example embodiment of the present application. Referring to FIG. 9, the weights used for prioritization from the remote server or system(s) may be based on the values from FIG. 6, which are calculated as follows: Local Weights+Remote Weights×2=Applied Weight. In this example, the weights applied to the results from the remote area are twice as high as the weights of the results from the local area. Any other multiplier or weighing system may be utilized without deviating from the scope of the current application.

Other types of weights can be determined according to the origination of the result (local vs. remote system), various combinations results, and the time stamp of the results.

FIG. 10 illustrates a legend 1050 for certain types of results according to an example embodiment of the present application. Referring to FIG. 10, each of the functional areas of the possible results are mapped to a symbol that is then used in the equations that follow to determine the weights for various scenarios. Examples of symbols include 'A'=information clicked, 'B'=information served, 'C'=requested searches, 'D'=groups joined/created, 'E'=emails, 'F' calendar events, 'G'=surfing history, 'H'=location, 'I' games, 'J'=video, and 'K'=GPS.

FIG. 11 illustrates a table 1100 of weight calculations for certain results according to an example embodiment of the present application. In one example of FIG. 11, an equation description may include any of the following: $K_1 3+[A,B,C,D,E,F,G,H,I,J]$ represents the GPS local×3+other data, $G_1 2+[A,B,C,D,E,F,G,H,I,J]$ represents surfing history local×2+other data, $(F_r+D_r)2+[A,B,C,E,G,H,I,J,K]$ represents remote groups and calendars×2+other data, If ([A,B,C,D,E,F,G,H,I,J,K]timestamp<=5 days) then [A,B,C,D,E,F,G,H,I,J,K]2 represents data×2 if timestamp is recent, G12+[A,B,C,D,E,F,G,H,I,J] represents surfing history local×2+other data, and (A+K)2+(A+E) represents information clicked+GPS and information clicked+email.

In one embodiment of the current application, the above calculations of FIG. 11 are used to create and calculate the interests of the user for re-application to subsequent searches and results. In another embodiment, the categories are initially established by the application 450 according to the interests of the user as described above. For example, during the analysis of the user's interests, the application 450 determines that "bike riding", "music", "concerts" and "horseback riding" are topics of interest associated with the user and these categories will be part of the default categories established in the repository(s) 510 and/or database server 12/26. As mentioned, the application 450 can be present in any device. Assuming that the application 450 is present in the client device 18/20/22, the following example of FIG. 12 depicts a possible implementation of how the user's interests are provided to the data repository(s) 510 so both the application 450 and the repository 510 are located inside the client device 18/20/22.

Figure 12:
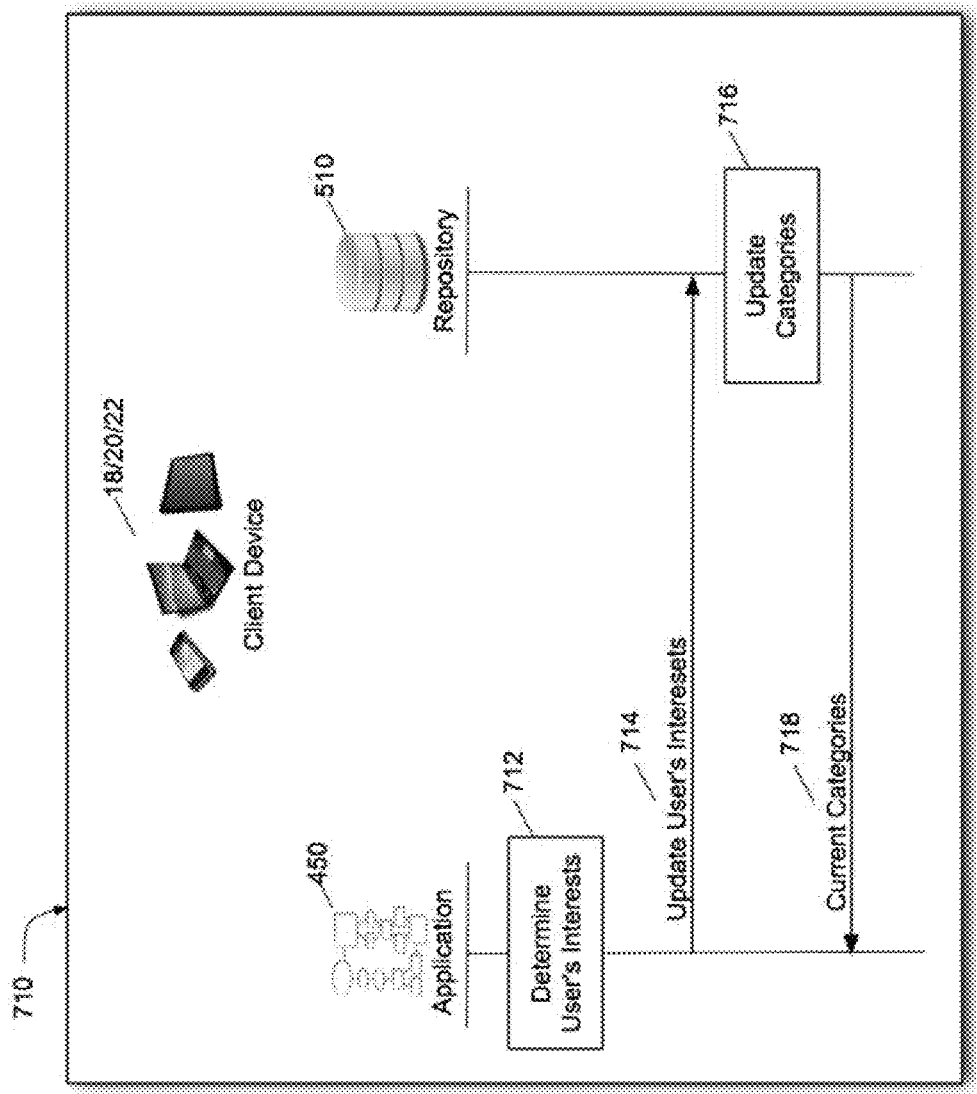
FIG. 12 illustrates a system communication diagram of updating categories according to user interests according to an example embodiment of the present application.

FIG. 12 illustrates a system communication diagram of updating categories according to user interests according to an example embodiment of the present application. Referring to FIG. 12, an example implementation 710 of a communication flow of operations is illustrated according to the categories being updated by the application 450 after the user's interests are determined and the data repository is located inside the client device 18/20/22. The user's interests are determined at operation 712 via the application 450. Once the interests are determined, a list of the interests are sent to the repository 510 by an "Update User's Interest" message 714, for example, which can be an internal message or external message to the device 18/20/22. The data repository 510 can handle the additional new elements received in the "Update User's Interests" message by creating a new table in the data repository's database, or otherwise permit entries to be stored in that additional category in the future 716. The data repository responds back with an optional "Current Categories" 718 message, for example, that is received by the application 450.

Example embodiments include scanning various information sources including scanning emails, scanning voice calls, scanning text messages, scanning social network postings and entries, scanning Internet browsing history, scanning Internet query entries, etc. Scanning may include parsing words from the various information sources and/or matching words to alias terms and comparing the identified words to known categories or topic fields. The weights may be applied to any word category or topic category once the categories are determined from the information sources.

Figure 13:
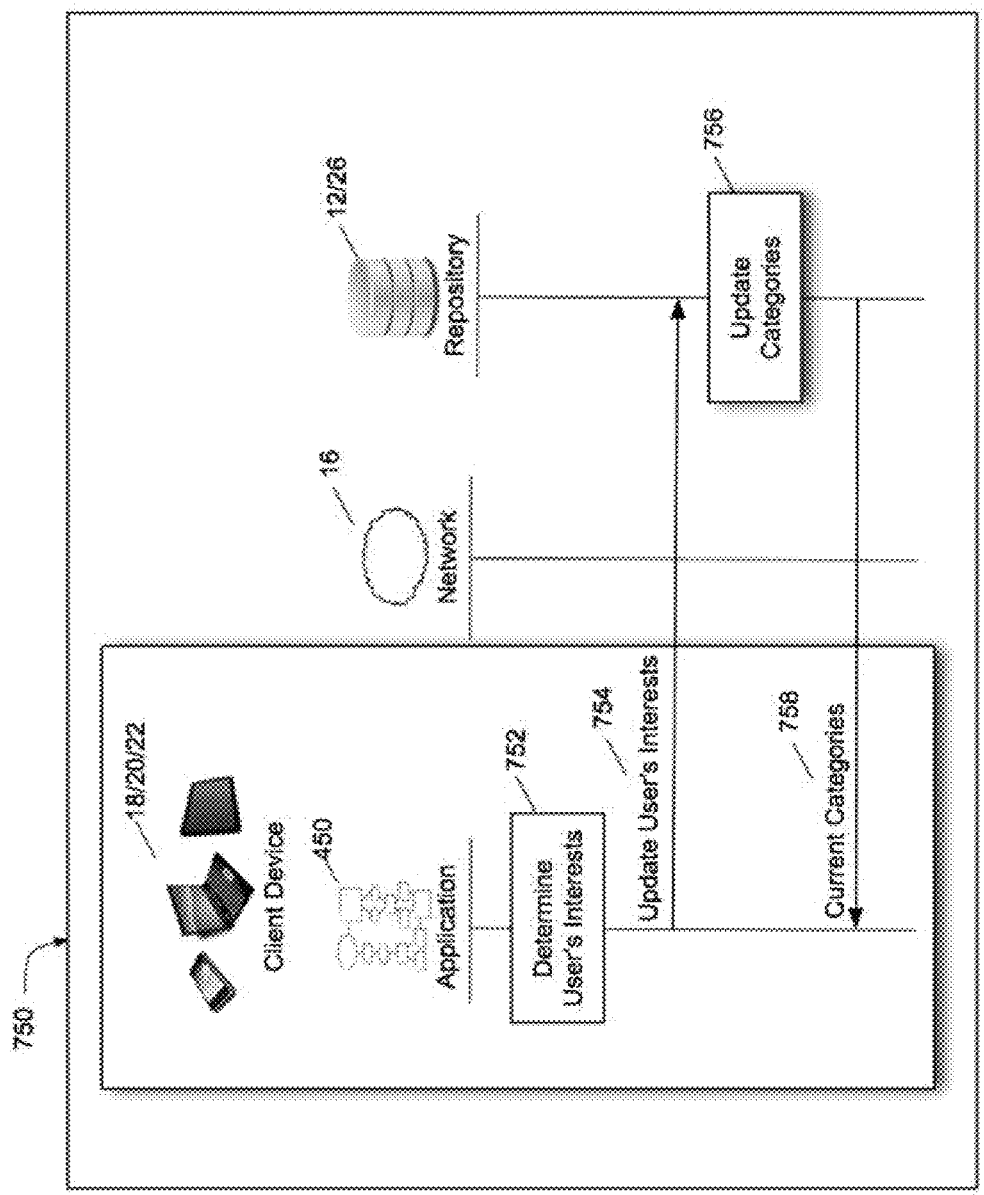
FIG. 13 illustrates another system communication diagram of updating categories according to user interests according to an example embodiment of the present application.

FIG. 13 illustrates another system communication diagram of updating categories according to user interests according to an example embodiment of the present application. Referring to FIG. 13, this communication diagram illustrates another possible implementation 750 of a flow of the categories being updated by the application 450 after the user's interests are determined and the data repository is located outside of the client device 18/20/22. The user's interests are determined at operation 752. Once the interests are determined, a list of the interests are sent to the data repository 12/26 by an "Update User's Interest" message 754. This message is routed through the network 16, and routed to the data repository 12/26, which can handle the additional, new elements received in the "Update User's Interests" message by creating a new table in the repository's database, or otherwise permit entries to be stored in that additional category in the future 756. The data repository responds back with an optional "Current Categories" 756 message that is sent through the network 16 and received by the application 450.

In another example, the "Current Categories" message 718/756 is sent to the application 450 whenever the categories are updated in the repository 12/26 such that the user is made aware of the current condition of the categories in the data repository.

Figure 14:
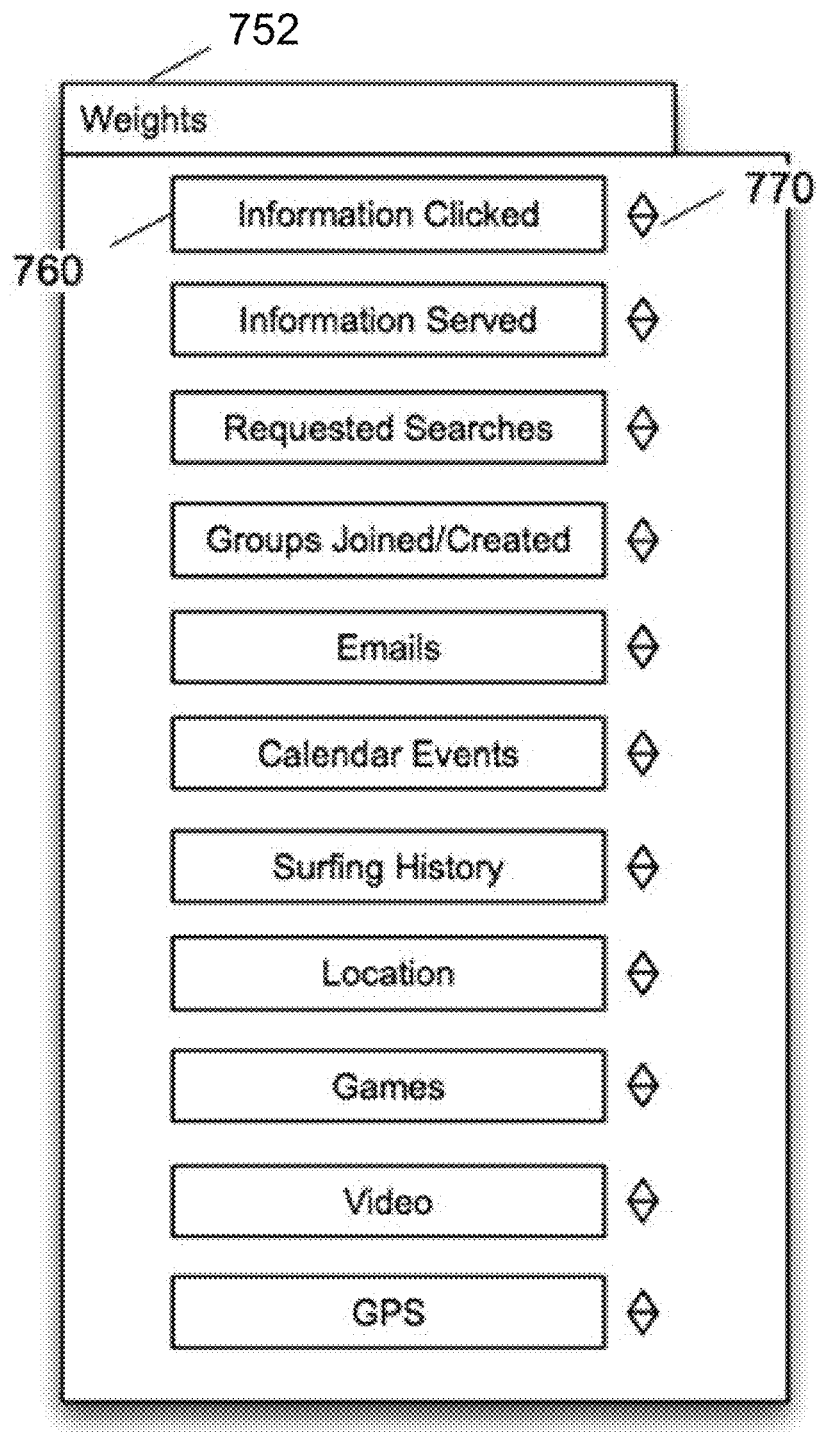
FIG. 14 illustrates a weight calculation table according to an example embodiment of the present application.

In another example, the user may have the opportunity to customize the weights which are applied to the results. For example, a user interface may be used to permit the user to determine if specific results should have a higher or lower weight than what was previously assigned. For example, a sample window is depicted in FIG. 14, which permits the user to modify the priority of the elements that determine the user's interests. Referring to FIG. 14, a possible implementation 752 of a GUI of the configuration section is illustrated. This configuration permits the user to arrange the priority of the elements that the application 450 utilizes. The current application can utilize the customized weights in determining the interests of the user by weighting the categories of interests accordingly and applying those weighted categories to subsequent actions. The GUI depicts the list of elements 760 that the application 450 utilizes to determine the user's interests. These elements are for example only and other elements may be included and/or current elements can be replaced without deviating from the scope of the current application. Further a greater or lesser number of elements can appear, statically or dynamically.

The user is able to utilize a move component 770 to move the respective element up or down. By clicking on either the top portion of the move component or the bottom portion of the move component, the user is able to reorder the elements in the list/queue or elements so the top of the list has the highest priority and a decreasing priority as the list goes downward. This corresponds to weighting factors as well. In another embodiment, the user has the ability to set various elements as equal priority based on an equal sign, for example, being selected for two or more elements (not shown).

In another example, as the user moves the pointer over the top of portion of the move component, the top portion of the move component changes color or a likewise action is performed to provide feedback to the user that the top portion of the component is currently selected. As the user removes the pointing device with the top portion of the move component selected, that respective element is swapped with the element above. Similarly, as the user moves the pointer over the bottom of portion of the move component, the bottom portion of the move component changes color or a likewise action to provide feedback to the user that the bottom portion of the component is currently selected. As the user removes the pointing device with the bottom portion of the move component selected, that respective element is swapped with the element below. This permits the reorganization of the elements. Other similar functionalities may be utilized without deviating from the scope of the current application. For example, the move components may not exist and the elements may be "dragged and dropped" to any other element, or such actions can occur based on verbal or gesture commands, and the list is reordered according to where the element is dropped.

In another example, the user has the opportunity to validate the system-defined result(s) by acknowledging the result(s) from the system server 14/24. The client device 18/20/22 receives a notification of the interest determined from the system server 14/24 by receiving a notification routed through the network 16. The user can interact with the display to accept or deny the determined interests. A response message is returned to the System 14/24, routed through the network 16 to complete the correspondence.

In another example, a GUI (not shown) can be used by the user to adjust the weights, to make adjustments, and determine how the system behaves based on the user's interests. This GUI window permits the adjustments of the weights shown in FIG. 6 so the user is able to modify each of the weights for both the local system and the remote system. The Internet files of a user device may or may not contain relevant data due to the ability for the user to erase their history via the browser, or to enable "private browsing". Private browsing is gaining more popularity among browsers. When a user enables private browsing, the local system does not store local tracking files. If a user of the current application has private browsing turned on, the local system cannot contain updated tracking files, thus when querying both the local and remote systems, the remote data can be given a higher weight due to the lack of data in the local system or via an older timestamp of the local data rendering the data invalid. In another example, any other weighing system may be utilized without deviating from the scope of the current application.

To enable the storage of the data in the data repository in a manner that is useful to the user, certain divisions of the repository or categories may permit for the data to be stored according to specific criteria. The user establishes the categories or the categories are automatically, initially provided that permit for a granular approach in the storage of the data in the repository. The categories may also be created or setup to permit updates from recent activity performed by the user device. In one example, the categories are established automatically. These categories are configured in the application 450 and are categories that are normally utilized among other users of the application 450. These categories are modified and removed by the user in the configuration section of the application 450. For example, the application 450 can display a default selection of the categories as depicted in FIG. 15.

FIG. 15 illustrates a table of default categories in a data repository according to an example embodiment of the present application. Referring to FIG. 15, an example of default categories 800 is illustrated. The categories may be part of the data repository 510. This default selection of categories may be what other users have selected as categories in the application and/or obtained from an understanding of the user's interests. The determination of the user's interests is described above. Using the calculated interests of the user, the application 450 creates categories reflecting these interests.

The application 450 collects the categories of all implementations of the application. This is accomplished by the analysis of the repositories of the users communicating with the data repositories through the network 16. Obtaining the list of the categories selected by the users of the application, an understanding of which categories are common among all or most of the users is possible. Upon initialization of the application 450, a default listing of categories can be provided which reflect the most common categories among all or most of the users.

Figure 16:
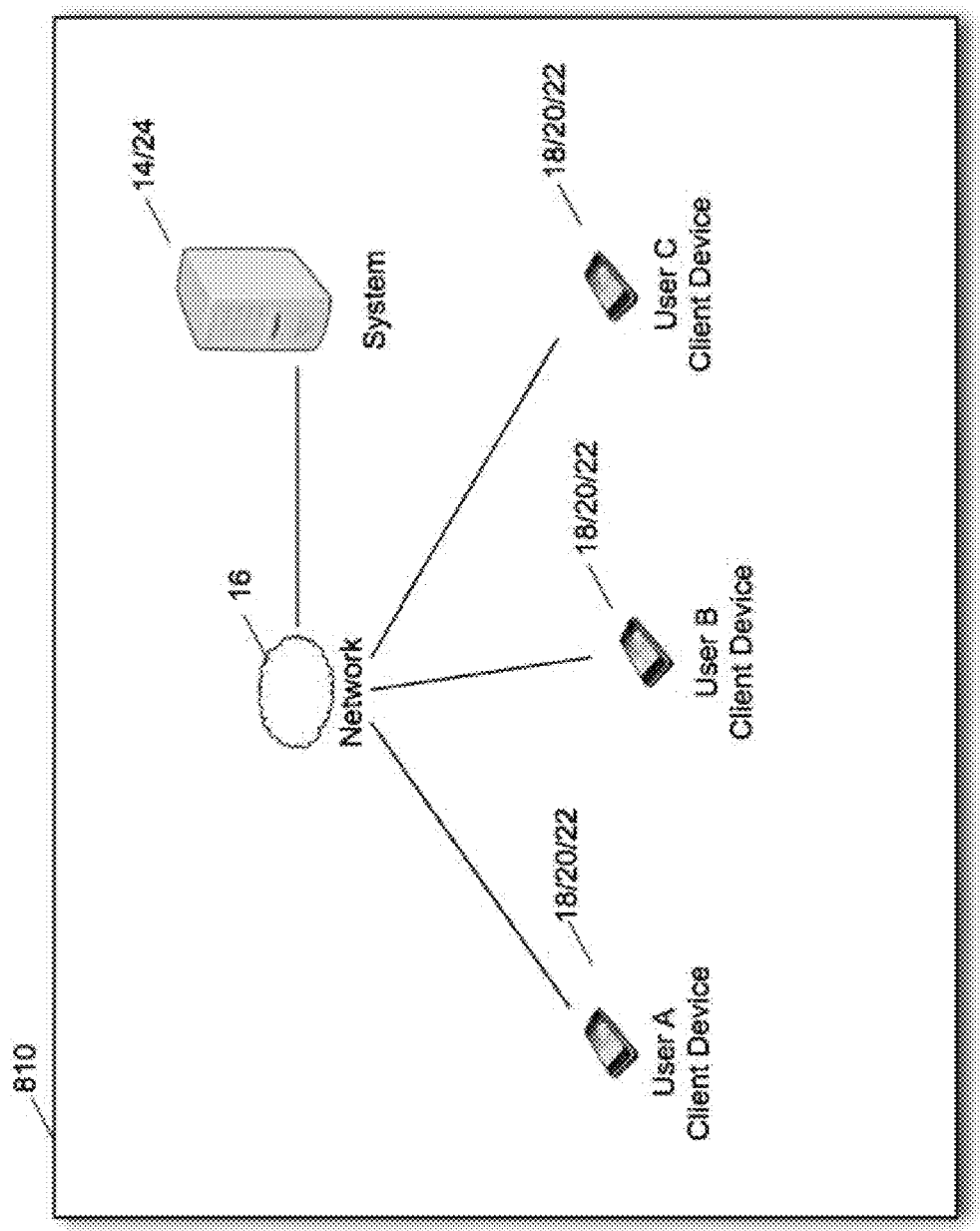
FIG. 16 illustrates a system network diagram of interworking with users to obtain default categories according to an example embodiment of the present application.

FIG. 16 illustrates a system network diagram of interworking with users to obtain default categories according to an example embodiment of the present application. Referring to FIG. 16, a possible implementation 810 of a network diagram depicts multiple client devices 18/20/22 interworking with the system 14/24 communicably coupled to the client device(s) 19/20/22 through the network 16. In this scenario, there exists three users including user A, user B and user C, all of whom are users of the application 450. In each of the three implementations of the application 450, the current categories in the respective repository(s) 510 and/or 12/26 are sent to the system 14/24 through the network 16 in a message (not depicted). These categories are stored in the system 14/24 such that the system 14/24 understands common categories of the users. The system 14/24 can examine the current categories of the users of the application 450 and create a common list of categories that users of the application 450 are utilizing.

This list of common categories can then be provided to new or existing users of the application 450 such that they can utilize the categories that are common among all users of the application 450. The user is able to modify and add to the default categories (not depicted) in order to make them reflect the current interests. In one embodiment, the user clicks on a category and the application 450 responds by making the category name modifiable. In another example, the user is able to configure the categories of the stored data. This occurs in the configuration section of the application where the user may click on a category title and have it renamed by typing in a new category title.

The configuration of the data repository(s) 510 and/or 12/26 can be navigated in the application 450 on the client device 18/20/22. This permits the user to view the contents of the data in the repository(s) 510 and/or 12/26. The user can browse the local repository located on the client device 18/20/22) or the remote depository 12/26.

Figure 17:
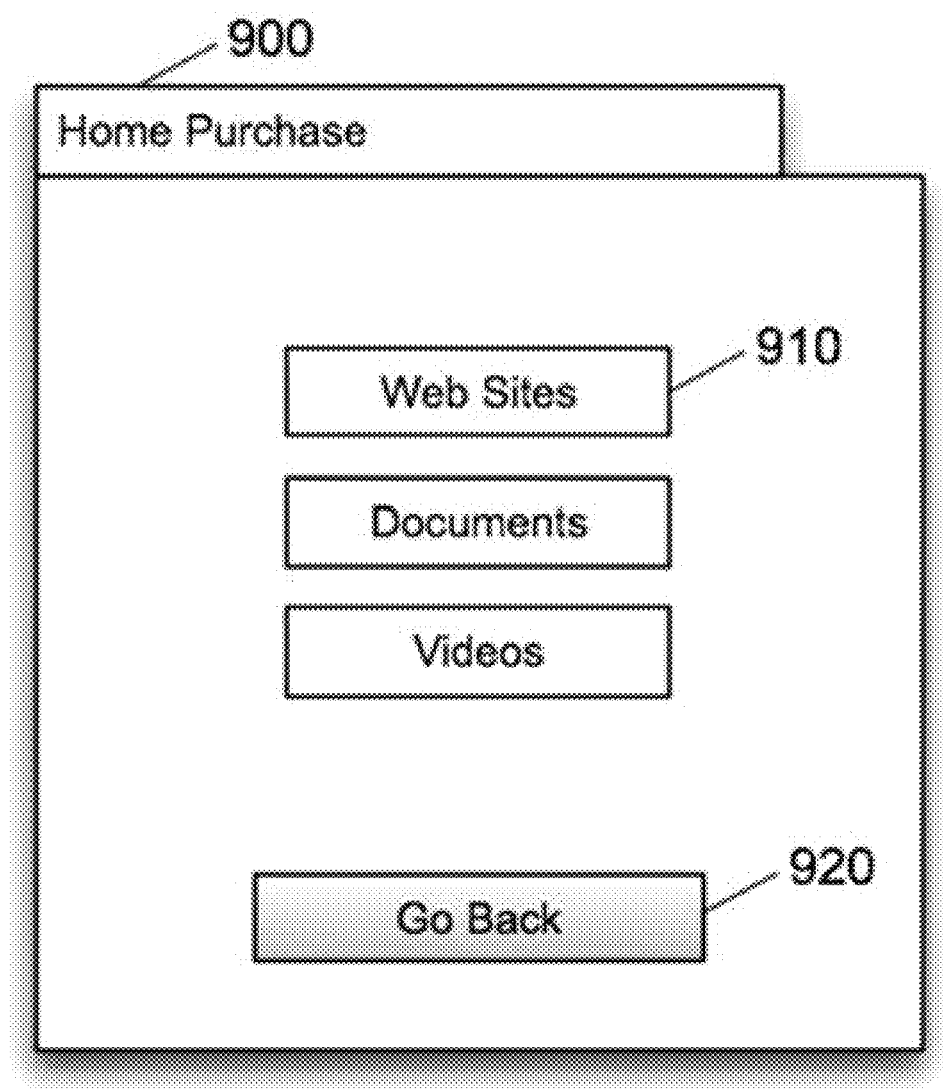
FIG. 17 illustrates a user interface configured to browse the data repository according to an example embodiment of the present application.

FIG. 17 illustrates a user interface configured to browse the data repository according to an example embodiment of the present application. Referring to FIG. 17, one possible implementation 900 depicts a user browsing the repository(s) 510 and/or 12/26. The user would have previously chosen the "Home Purchase" button on the first level of the view of the repository 800. The title of the tabbed component 900 reflects a title respective of where the user currently is located in the repository(s) 510 "Home Purchase". There are buttons in the display 910 reflecting the data that is located in the repository for the specific group (Home Purchase group). In this example, there are three areas: Websites, Documents and Videos. The application 450 places the data into the respective areas according to the type of media. There is a navigation button on the bottom 920 so the user is able to navigate upwards in the hierarchy of the repository(s) 510 and/or 12/26.

Figure 18:
FIG. 18 illustrates another user interface configured to browse the data repository according to an example embodiment of the present application.

FIG. 18 illustrates another user interface configured to browse the data repository according to an example embodiment of the present application. Referring to FIG. 18, a further possible implementation 1000 depicts a user browsing the repository(s) 510 and/or 12/26. The user would have previously clicked on the "Website" button in the previous view. This view shows that the user is currently viewing "Home Purchases/Websites" as noted in the title of the tabbed component 1000. There are two websites on the current view 1010. The addresses of each of the sites are the text of the two buttons. The user is able to click on a button 1010 so the website associated with the button is then executed, which enables the browser pointing to the website.

According to another example, the application 450 receives the data from one or more of the inputs and stores the data in repository(s) 510 and/or 12/26 as described in the above examples. This data can be various different formats and can be stored in a local source (stored on the device 450) or a remote source (stored in the cloud or network 16) database. The communication between the application 450 and the database may occur utilizing a database protocol, such as the structured query language (SQL). Using database protocols, the application 450 may query the database to obtain previously stored content. This architecture permits granular access to the user's stored data.

The application 450 examines specific elements of the file contents to determine where in the repository 12/26 the file should be stored. For example, the following elements can be used to determine the subjective content of the file, including but not limited to file title, the file contents and the file metadata. The file's title may help determine the nature of the file and therefore determine where the file should be stored in the repository(s) 510 and/or 12/26. The file's contents may help determine the location in the repository(s) 510 and/or 12/26 where the file should be stored. For example, the use of image analysis tools, video analysis tools, and/or text analysis tools can be utilized to determine the contents of the file. The file metadata or meta-elements (i.e., metadata and/or metatags), and any other data that is normally used to determine the file's contents may be used to organize the data.

Meta-elements are the HTML or XHTML elements used to provide structured metadata about a webpage. Meta-elements can be used to specify page descriptions, keywords and any other metadata not provided through the other head elements and attributes. Using these meta-elements, a file's contents may be understood. The detailed examples below attempt to cover the overall functionality of when data is sent to the repository(s) 510 and/or 12/26 as well as the types of data that can be sent in order to provide the reader with an overall understanding of the flow of the application by providing examples. Other types of functionality can be designed and implemented when the data is sent and the types of data that is sent can be easily designed and implemented without deviating from the scope of the current application. Passive data is the scenario when application 450 performs a function in real-time or anytime without the user initiating the function or being aware of the function being initiated, performed or completed. This operation can occur based on at least one of a period of time, an amount of information collected, a type of information collected, a quality of information collected, and a source of the information before ceasing operation. The throttle of the storage of data captured through passive functions is necessary to avoid the collection of thousands of articles, videos, etc. The over-abundance of data would be not be utilized by the user.

The application 450 can contain a configuration portion where the user is able to configure certain elements, permitting the functionality to behave as he/she desires. For example, there can be the following configuration elements in the application 450 which are grouped together and located in a specific "configuration" section of the application that is easily accessible at all times by the user. Examples of such configuration elements include length of time in uploading data per event (minutes), a maximum amount of data collected per event (MB), a maximum number of files to collect per event, a maximum number of bits/bytes to collect, a minimum quality of video files (bit rate), a maximum quality of video files (bit rate), a minimum quality of audio files (bit rate), a maximum quality of audio files (bit rate), a maximum size of data files (MB), etc. The source of the data may be derived from the client device 18/20/22. These configuration elements permit the user to specify specific parameters of the data that may be captured in the application 450 and to help limit the capturing of an abundance of data that is unmanageable due to the size of data captured.

The listed configuration elements serve only to exemplify the types of information that may be present in configuration the data sent to a repository(s) 510 and/or 12/26. Other similar configuration elements can be present without deviating from the scope of the current application. In one example, the application 450 captures sound by recording the sound from a microphone 420 on the device 400. The application stores the sound in a file that is created and written locally on the device 400 or is directly uploaded to the repository(s) 510 and/or 12/26 (i.e., streamed). This data is sent to the local repository 510 and/or the remote repository 12/26. The application 450 may capture video by recording the video from the video recording device 450 on the device 400. The application stores the video in a file that is created and written locally on the device 400 and/or which is directly uploaded to the repository(s) 510 and/or 12/26 (streamed data). The data is sent to the local repository 510 and/or the remote repository 12/26.

In another example, the application 450 captures music by storing one or more of the actual music file, or a link to the music file. When the user is either browsing a song, or viewing a video of a song and the command is received that the user desires to store the song in the repository(s) 510 and/or 12/26, the song file either referred to on the device 400 or a link to that song is stored in the repository 510 and/or the remote repository 12/26. The application 450 captures messaging between the user and an acquaintance, or messaging referred to on the device 400 and stores it either in the local repository 510 and/or the remote repository 12/26. In the scenario where the user is in a messaging application on the device 400, when the command is received and the user desires to store the messaging text in the repository, the text history of the conversation is sent to the local repository 510 and/or the remote repository 12/26.

In another embodiment, the application 450 retrieves additional dialogs permitting the user to select the exact portions of the conversation that are to be stored. In the example where messaging is desired to be sent to the repository(s) 510 and/or 12/26, and the user is not currently in a conversation, the user displays the conversation to be sent via the messaging application on the device 400 and provides the command to send data to either the local repository 510 and/or the remote repository 12/26. The displayed conversation is then sent to the repository(s). In another embodiment, the application 450 retrieves additional dialogs permitting the user to select the exact portions of the conversation that are to be stored.

The application 450 captures voice via the application running on the client device 18/20/22. For example, the user can initiate a microphone button on the device so the application 450 can control the hardware in the device to record the verbiage. The information can be dynamically processed or stored and processed subsequently. The recorded data is then automatically or not automatically loaded in the appropriate location in a folder or category on the local repository 510 and or a local repository 12/26.

In another embodiment, the application 450 automatically organizes the data in the repository and interacts with the user regarding the organization of the data. The application 450 analyzes similar information stored in the repository 510, 12/26. For example in FIG. 19, if the repository contains information in a category "Music Equipment", such as the example in FIG. 19, the data may be organized in alphabetical order to include categories, such as a manufacturer (e.g., Sony, Yamaha, etc.) and a model number and web address as part of a table 1900 stored in memory. The information in the repository 510, 12/26 is processed and the usable or relevant information is delivered to the user. For example, the table information in the repository in FIG. 20 is further processed such that information is obtained and formulated for delivery in a user-friendly interface 2000, the make and model 2010 is paired with a price 2020 all obtained from various data source links and formulated in the repository for delivery. The current price may be obtained from published APIs and third party sources that contain the researched audio equipment (i.e., Amazon.com, Bestbuy.com, eBay.com, etc.). APIs can be accessed based on the extracted product data and then subsequently combined for a finalized user interface. Other information can be obtained from these and other similar sites utilizing the application's APIs. This product information is delivered to the user in a format such that the user is able to interact with the entries to gain more information if desired. For example, the following GUI 2000 displays an example of the information presented to the user.

FIG. 20 illustrates another example implementation 2000 depicting information from the repository(s) 510 and/or 12/26. This information can automatically be delivered to the user and/or the user can prompt the application 450 for a summary of the information in the repository 510, 12/26 by interacting with the GUI of the application 450. The user interacts with the GUI 2000 by selecting either the equipment name 2010 or the price 2020. This permits for further information to be delivered so that the user can receive more detailed information related to the equipment. For example, if the user selects the equipment name 2010, the application 450 formulates a request and sends this request to the network 16 that is then routed to a website that contains further information on the specific equipment. Such information requested may be the equipment's factory site, or any other site that contains further information related to the specific model of the chosen/clicked equipment. The result(s) are delivered to the application 450 and displayed on top of the GUI 2000 of the client device's 18/20/22 Internet browser or any other method normally used to display websites on the device.

In addition, if the user selects on the price 2020, the application 450 formulates a request and sends this request to the network 16 that is then routed to a website that has that particular equipment for sale. This may be an Internet shopping site for example. The result(s) is delivered to the application 450 and displayed on top of the GUI 2000 on the client device's 18/20/22 Internet browser or any other method normally used to display websites on the device. In another embodiment, selecting the equipment model 2010 will, in addition to or in place of the details of the model being displayed, the model's ratings from other users will be returned. These ratings can be from a site that specializes in reviewing that particular equipment, or a well-known site that contains user ratings or the first result of various different results from a search engine. More or less information can be contained in the information returned to the user. For example other details regarding the product may be provided including the closest place where the item can be viewed, ratings on stores selling the product, places that are selling the product on online sites (e.g., EBAY or CRAIGSLIST).

In another embodiment, selecting one of the elements 2010 and/or 2020 will link to installers that are local to the user utilizing location services on the client device 18/20/22. Such results are returned so the user can select a company that is local and so the user can contact that company to install the equipment or gather additional information on the equipment.

In another example, the pricing is automatically updated with price changes. For example, if the equipment goes on sale, the application 450 will update the price of the equipment and notify the user of the sale price change. This can be a change in color of the price to a color reflecting a change (for example a green color). This is accomplished by the application 450 regularly accessing application programming interfaces (API) of well-known Internet sites that permit applications to interface with their data. In another embodiment, certain information can be removed such that the user does not desire to gather information on that type of equipment. This can be accomplished by adding a "Remove" button on the bottom of the GUI 2000 (not shown). When the "Remove" button is pressed, a confirmation button is presented to the user for validation that the user understands that all of the information for the current category will be permanently deleted.

In another example, certain information can be added to the table, for example a new model becomes available in the user's price range. In another example, reminders can be stored in the repository 510, 12/26 such that when a user inputs a reminder, the application 450 takes the input and creates a reminder. The reminder is processed by the application 450 and an item is stored in the proper category in the repository 510, 12/26. For example, if the user says "Don't forget to buy milk", the application 450 takes the input and using speech-to-text functionality parses the text and creates tokens from the input. The two words "buy" and "milk" may be tokens that are used to insert "milk" into a shopping and/or reminders category in the repository 510, 12/26. This permits the user to utilize speech to automatically create reminders and store them within the application 450. In another embodiment, the user says the word "reminder" and the application 450 accepts this as input to the application so the current entries in the category "reminder" and/or "shopping" are returned to the client device 18/20/22. For example, the user of the application 450 may be searching for a house for sale. The user may utilize a browser on the device 400 to search for real estate and select specific properties within a certain area. During this interaction, the user either provides the command to send data to the repository(s) 510 and/or 12/26, or the data is automatically uploaded to the repository(s) 510 and/or 12/26.

Upon reception of the data, the characterization of the incoming data is performed by the application 450. The application 450 determines that the website is referring to houses for sale (i.e., ZILLOW) and the properties selected pertain to a certain area (i.e., Denton, Tex.). Therefore, a category is established in the repository 510 and/or 12/26 entitled "Houses" which is where the uploaded data is stored. This configuration can be implemented by creating a table entitled "Houses" in the database of the repository(s) 510 and/or 12/26. The next time the user uploads data pertaining to a house for sale, it would automatically be placed in the "Houses" area of the repository 510 and/or 12/26.

In another example, the application may provide feedback to the user regarding the category that the data is being placed. In this example of FIG. 21, a message will be returned so the application 450 would display a message containing "Repository Category=Houses". This information aids the user in understanding the establishing of the data in the repository(s) 510, 12/26. If the user desires to add data to that specific category in the future, the category can be provided in a command permitting the placement of the uploaded data to that specific category. The application 450 residing in the client device 18/20/22, the system 24, the remote system 14 or any other element depicted or described herein, includes instructions that permit data in the repository 510 and/or 12/26 to be combined with other data so intelligent response(s) are delivered to the user.

In the example of FIG. 21, the user of the application 450 may be researching real estate for a new house. The user may be using the client device 450 to view various homes within a specific geographic area. These homes may also be stored in the data repository 510 and/or 12/26, filed in a category entitled "Homes". The application 450 can identify the type of house that the user is interested in viewing, such as the approximate square footage of the house, the geographic location that the user is interested in finding, the number of bedrooms and bathrooms that the user desires, etc. This can be determined by building a table and combining values in the columns of a houses table.

Once the table is established, the user may begin to search for home theater equipment using the client device(s) 18/20/22 to research audio equipment including televisions, home entertainment systems, etc. These entries are also stored in the repository 510 and/or 12/26 in a category entitled "Home Theater". The application includes functionality that permits intuitive interaction between these two defined categories: "Homes" and "Home Theater". For instance, the application automatically determines that the user is both interested in purchasing or renting/leasing a certain type of home and is also interested in home theaters. Given this information, the application 450 automatically begins to search for homes with a home theater room even though the previous homes researched by the user have not specifically included homes with theater rooms.

An object may be used to combine like objects to enable the application 450 to recognize that the user may be interested in homes with media rooms. The application 450 can ascertain that a media room is available in homes by analyzing the APIs of the real estate sites, and parsing through the columns of the returned data for items, such as "home theater", "surround sound", etc. The application also cross-correlates that "media equipment" is part of a media room, as well as "media furniture", etc. The application can begin to perform intuitive interactions with seemingly unrelated activities. The media room and audio equipment is solely provided to give example as to the interaction possibilities. Many other types of interactions can be included into the application 450 and repository 510 and/or 12/26 without deviating from the scope of the current invention.

For all the recommendations made by the application 450, the user will have the ability to easily dismiss the proposed interaction by voice, gesture, a button on the GUI, or any other like action. The interaction is then removed in both the application 450 and repository(s) 510 and/or 12/26. In another embodiment, the application automatically interfaces with published APIs that offer interaction with real estate applications. For example, the website associates with ZILLOW may have a published API that permits remote applications to interface with the data and obtain and present details, such as property details, city and neighborhood statistics, mortgage rates, and home valuations. This data is presented separately or in conjunction with other home related information.

The application 450 can obtain additional listings with homes that the user may be interested in viewing based on the user's submitted variables, such as approximate home value, number of bedrooms and bathrooms, square foot, including homes with media rooms. The application 450 notifies the user with additional homes for sale with media rooms, by automatically creating a new category entitled "Homes With Media Rooms" 2100. This new category can be linked with the "Homes" category optionally, or may be an entirely new category created automatically based on a most recent interest submitted.

FIG. 21 illustrates another example user interface with a customized product category corresponding to recent user interests submitted according to example embodiments. Referring to FIG. 21, a notification based on combined data is illustrated in the example 2100. This example depicts information from the repository 510 and/or 12/26 being delivered to the user's client device 18/20/22 that the user has not specifically requested. The real estate listed in the data delivered to the user includes homes within the area that the user may have been researching. In this example, the location of interest is Atlanta Ga. The listings listed in interface 2100 are those that have not been previously stored in the repository 510 and/or 12/26. In addition, the homes include those that match predetermined criteria, such as square footage, number of bedrooms and bathrooms, price range 2120 and any other elements of the homes that reflect what the user has is seeking. In addition, those homes 2110 also have a dedicated media room based on a recent interest submitted by the user. In this example, the application has retrieved the list of houses and delivered them to the user device in a user interface by creating a separate category in the repository 510 and/or 12/26 because the user has also been also searching for media room related equipment independently of the original home search query.

In an alternate embodiment, an informational message may be created and provided to the user device, such as "These homes are based on your recently searched for media room types of equipment." The user may be presented with the option to agree with the added data, or dismiss the data by the appearance of two buttons on the bottom of the informational message: "Not interested" and "Continue". If the user selects the button entitled "Not Interested", the category is deleted along with all of the data in the category. If the user presses the button entitled "Continue" then the data remains and the user is able to interact with the data.

In another example, the user selects the home's address in the window 2110, the home's listing is displayed using a published API from a real estate website. When the user selects the listing price 2120, additional data can be delivered, such as other homes in the area that are similar to the price range, or additional homes within a predetermined geographic area with a similar price. These homes are determined by the application 450 interfacing with the published APIs of the real estate website. In an alternate embodiment, the data stored in the repository 510 and/or 12/26 is ordered such that different properties can be utilized to sort and present the data in the repository. For example, the initial order of the properties can be: 1. Location, 2. Price, 3. Size, 4. School District, 5. Pool, 6. Lot size and 7. Etc. The user is able to reorganize the order that the data is presented in the repository. For instance, the user can move textual components up or down to reprioritize the elements such that the data is presented in a manner suitable to the user. Other methods include reorganizing the priorities of the elements such that the data is presented in another, prioritized manner without deviating from the scope of the current application.

The order of the data presented reflects the most current operations utilized by the user for querying the data. For example, if the user has filtered the queries of properties by size, the presented list of the properties in the repository 510, 12/26 will be first ordered by size. The current filter properties is obtained from real estate websites and alternatively by the application 450 interacting with the published APIs of the real estate websites.

The application 450 receives the data from one or more of the inputs submitted and stores the data in repository(s) 510 and/or 12/26 as described above. This data can be of various formats and can be stored in a local (stored on the device 450) or remote (stored in the cloud or network 16) database. The communication between the application 450 and the database may occur utilizing a database protocol such as the structured query language (SQL), for example. Using database protocols, the application 450 may query the database to obtain previously stored content. This architecture permits for a granular access to the user's stored data.

The application 450 examines specific elements of the file contents to determine where in the data repository 12/26 the file should be stored. For example, the following example elements can be used to determine the subject of the file. The file title may help determine the nature of the file and therefore determine where the file should be stored in the repository(s) 510 and/or 12/26. The file contents and/or the content's title may help determine the location in the repository(s) 510 and/or 12/26 where the file should be stored. For example, the use of image analysis tools, video analysis tools, and/or text analysis tools can be utilized to determine the contents of the file. File meta-elements (for example metadata and/or metatags), and any other data that is normally used to determine the file's contents may also be used to organize the file storage. Meta-elements are the HTML or XHTML elements used to provide structured metadata about a webpage. Meta elements can be used to specify page descriptions, keywords and any other metadata not provided through the other head elements and attributes. Using these meta-elements, a file's contents may be understood.

In one example, passive data is the scenario when the application 450 performs a function in real-time or anytime without the user initiating the function or being aware of the function being initiated, performed or completed. This can happen based on at least one of a period of time, an amount of information collected, a type of information collected, a quality of information collected, a source of the information before ceasing operation, etc. The throttle of the storage of data captured through a passive approach is necessary to avoid the collection of too many (i.e., thousands) articles, videos, etc. The over-abundance of data would be unable to be consumed by the user. The application 450 can include a configuration portion so the user is able to configure certain elements, allowing the functionality to behave as he/she sees appropriate. For example, certain elements would be generally grouped together and located in a specific "configuration" section of the application and may be easily accessible at all times by the user including for example, length of time in uploading data per event (minutes), maximum amount of data collected per event (MB), maximum number of files to collect per event, maximum number of bits/bytes to collect, minimum quality of video files (bit rate), maximum quality of video files (bit rate), minimum quality of audio files (bit rate), and maximum quality of audio files (bit rate), maximum size of data files (MB). The source of the data is from the client device 18/20/22. These configuration elements permit the user to specify specific parameters of the data that may be captured in the application 450 and to help limit the capturing of an abundance of data that is difficult to manage due to the size of data captured. The listed configuration elements serve only to exemplify the types of information that may be present when configuring the data sent to the data repository(s) 510 and/or 12/26. Other similar configuration elements can be present without deviating from the scope of the current application.

The application 450 may capture sound by recording the sound from a microphone associated with input device 420 on the device 400. The application stores the sound in a file that is created and written locally on the device 400 or which is directly uploaded to the repository(s) 510 and/or 12/26 via streamed data. This data is sent to the local repository 510 and/or the remote repository 12/26. The application 450 captures video by recording the video from a video recording device associated with input device 420 on the device 400. The application stores the video in a file that is created and written locally on the device 400 or which is directly uploaded to the data repository(s) 510 and/or 12/26. The data is sent to the local repository 510 and/or the remote repository 12/26. The application 450 captures music by storing one or more of the actual music files or a link to the music file. When the user is either browsing a song, or viewing a video of a song and the command is received and the user desires to store the song in the data repository(s) 510 and/or 12/26, the song file either referred to on the device 400 or a link to that song is stored in the repository 510 and/or the remote repository 12/26.

The application 450 captures messaging between the user and an acquaintance, or messaging referred to on the device 400 and stores it either in the local repository 510 and/or the remote repository 12/26. In the scenario where the user is in a messaging application on the device 400, when the command is received and the user desires to store the messaging text in the repository, the text history of the conversation is sent to the local repository 510 and/or the remote repository 12/26. In another example, the application 450 retrieves additional dialogs permitting the user to select the exact portions of the conversation that are to be stored.

In the example where messaging is desired to be sent to the repository(s) 510 and/or 12/26 and the user is not currently in a conversation, the user displays the conversation to be sent via the messaging application on the device 400 and provides the command to send data to either the local repository 510 and/or the remote repository 12/26. The displayed conversation is then sent to the repository(s). In another example, the application 450 retrieves additional dialogs permitting the user to select the exact portions of the conversation that are to be stored (not depicted).

The application 450 captures voice via the application running on the client device 18/20/22. For example, the user can initiate a microphone button on the device and the application 450 controls the hardware in the device to record the verbiage. The information can be dynamically processed or stored and processed at a subsequent time. The recorded data is then automatically or not automatically loaded in the appropriate location in a folder or category on the local repository 510 and or a local repository 12/26. In the above examples, the user's device or client device 18/20/22 has been a traditional computer, a mobile device, or the like. Other types of devices may also be used to provide various alternate embodiments to the instant application. Interaction between the application 450 and a product, such as a wearable device (henceforth referred to as "wearable device") is also possible. The wearable device can also be a similar device worn on another part of the body other than the head, for example a shirt pocket or any other part of the body. The device may also be not worn on the user's body, but carried by the user. Other wearable devices may interact with the instant application, such as a watch, a bracelet, a foot/shoe device, etc.

In operation, the user's wearable device can snap a picture at preset or customized intervals, for example every 30 seconds. These pictures are stored in the device, or uploaded through wired or wireless connections to either another device on the user, a device that is not on the user, or remotely uploaded to the repository 510 and/or 12/26. The application 450 analyzes the pictures by using the geographic location of the user at the time that the picture was captured, as well as image analysis software.

Image analysis of captured photo, audio and/or video may include the extraction of meaningful information from input images mainly from digital images by a digital image processing technique. Image analysis tasks can be as simple as reading bar code tags or as sophisticated as identifying a person from their facial characteristics. The image analysis can ascertain various landmarks, such as buildings or roads such that the geographic area where the user is located is known by the application 450. This permits the application to identify a store or other landmark that the user is near or is visiting and also permit for interactions with the repository through messaging previously disclosed by the application 450. These interactions create a level of understanding so the application 450 can create and submit notifications to the user that the user may find interesting in a natural and autonomous manner without the user requesting or expecting to receive the notifications. For example, assuming that the user is walking near a furniture store. The user's wearable device takes an image of the store and determines the exact business through an image analysis operation cross-referenced with other data, such as GPS data and/or other identified landmarks. The application 450 then can access the repository 510 and/or 12/26 to determine if there is any category and/or data present that may interest the user. The messaging between the application 450 and the repository can includes queries to the database and/or any normally accepted messaging that is normally utilized between an application executing on a device and the network 16.

In another example, the application may determine that the user is currently shopping for a house due to the category "houses" or another similar category. Therefore, the user may be interested in shopping for furniture for the new house. In another embodiment, logic is built into the application 450 to permit for intuitive interactions between the data. In this example, there are tables built into the application 450 such that keywords are determined for the known or created categories. These keywords permit the application 450 to determine elements that the user may find of interest in categories that are seemingly unrelated. For example, if the user is shopping for a house, a category may be created in the repository 510 and/or 12/26 entitled "House". The application may add data to this category as the user researches real estate. This may occur by the user initiating the upload of the data to the repository 510 and/or 12/26, or it may occur automatically.

Following the image analysis of the photo captured by the user's wearable device, image analysis determines the store where the user is currently located by comparing the store's sign or unique characteristics with a database of images located in the repository 510 and/or 12/26, the system 24, the remote system 14 and/or any other element in the system diagram. This mapping is referred to as the "business mapping database". The business mapping database of stored images also contains the type of merchandise available for sale at the business location. This data can be stored in any element in the system diagram and be made available to the application 450. Alternatively, the details of the type of merchandise sold at the business location can be determined using published APIs on the Internet 16.

The application 450 may apply keywords that pertain to the categories in the repository 510 and/or 12/26 such that the key words are items of interest, which reflect key elements in the category henceforth referred to as the "keyword mapping table". For example a table may reflect the application's list of key words for the "House" category, such as category: house, furniture, moving companies, concierge, utility companies, pool companies, media room, home theater, carpet companies, etc.

The keywords in the keyword mapping table can be determined and applied for each category in the repository 510 and/or 12/26 such that each new category created is automatically associated with the predetermined keywords in the application 450. In another embodiment, the particular types of data in the keyword mapping table can be automatically associated with specific keywords. In this example, since the user has researched houses with pools, the keyword "Pool Companies" is automatically assigned to the category "Houses". Another example is the keyword "Home Theater" and/or "Home Theater Furniture" automatically assigned to the category because the user has researched and/or uploaded real estate containing home theaters or has performed recent searches which have been cross-correlated with subsequent searches.

Figure 22:
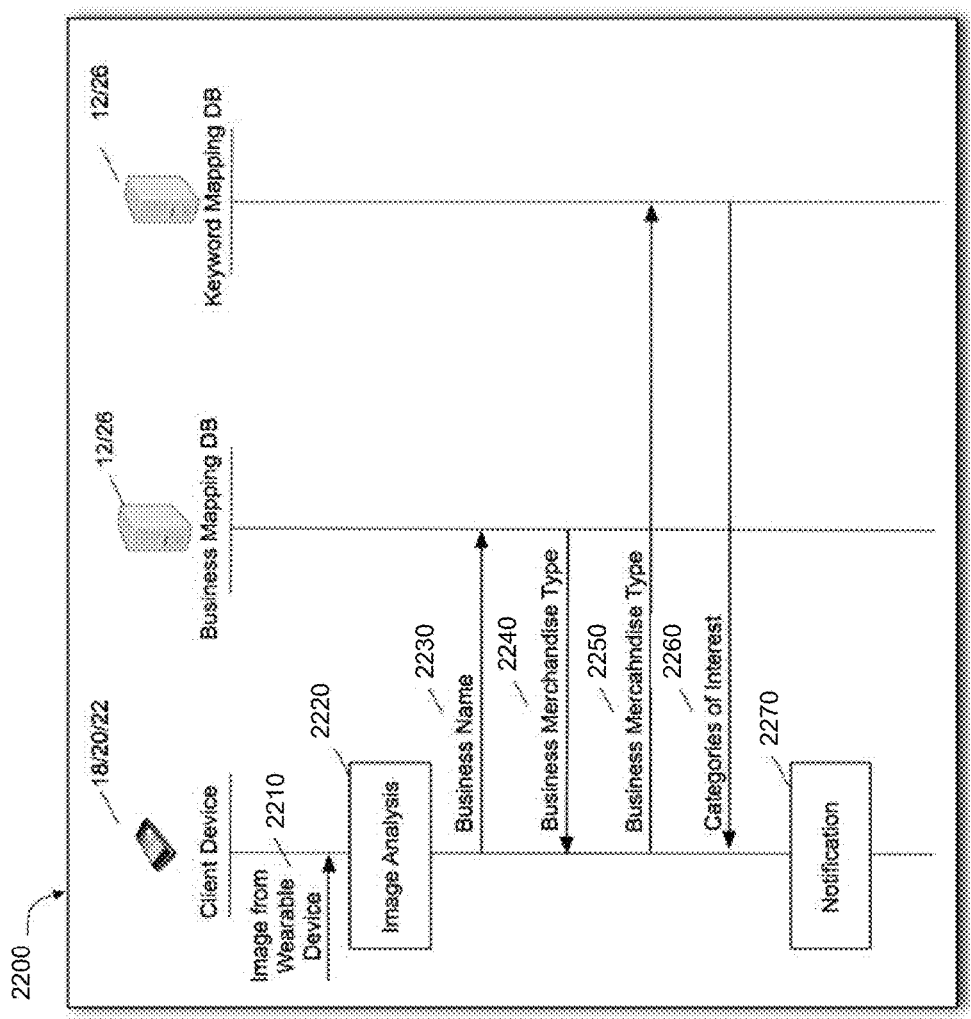
FIG. 22 illustrates an example communication system diagram of a user interest determination and corresponding notification procedure according to example embodiments.

FIG. 22 illustrates an example communication system diagram of a user interest determination and corresponding notification procedure according to example embodiments. Referring to FIG. 22, the example diagram 2200 is of a message flow where an image received from the user's wearable device is processed. The image 2110 is received by the client device 18/20/22 and this image can be received wirelessly or from a wired connection. Upon the reception of the image, an image analysis is performed 2220 and a business name is obtained referring to a business that is nearby to where the user is currently located based on the image data.

The business name may then be sent 2230 to a business mapping DB 12/26. This database may reside in one or more of the databases depicted in the system diagram 10, or can reside in any other component, which is communicably connected to the client device 18/20/22 through the network 16. The business mapping database receives the business name from the client device 18/20/22 (depicted). In another example, this message may originate from the system 14/24 and the image is sent to the system 14/24 through the network 16. The business mapping database queries the database using the name of the business. The type of business and the category of items for sale in the business is ascertained and returned 2240 to the client device 18/20/22. At this point, the client device 18/20/22 can determine the type of items for sale at the business that is determined to be nearby to the client device 18/20/22 is located.

The type of items sold at the nearby business are then sent to the keyword mapping database through the sending of a business merchandise type message 2250. This database may reside in one or more of the databases depicted in the system diagram or can reside in any other component, which is communicably coupled to the client device 18/20/22 through the network 16. The business merchandise type message is received by the keyword mapping database and the keywords of the current categories in the repository 510 and/or 12/26 are searched for a match. This query determines if there are any keywords from the user's categories in the repository(s) 510 and/or 12/26 that match. Any matches are returned in the categories of interest message 2260. This message contains the category(s) associated with any matching keywords in the keyword mapping database, as well as the keywords that matched. The application 450 then notifies the user 2270 of the match permitting the user to find further information that may be of interest. The application 450 is able to notify the user of further interesting data by accessing published APIs related to the business. For example, the application 450 may be able to gather information related to sales that the store is currently having, especially related to furniture items that the user may find particularly interesting, such as theater room furniture.

Figure 23:
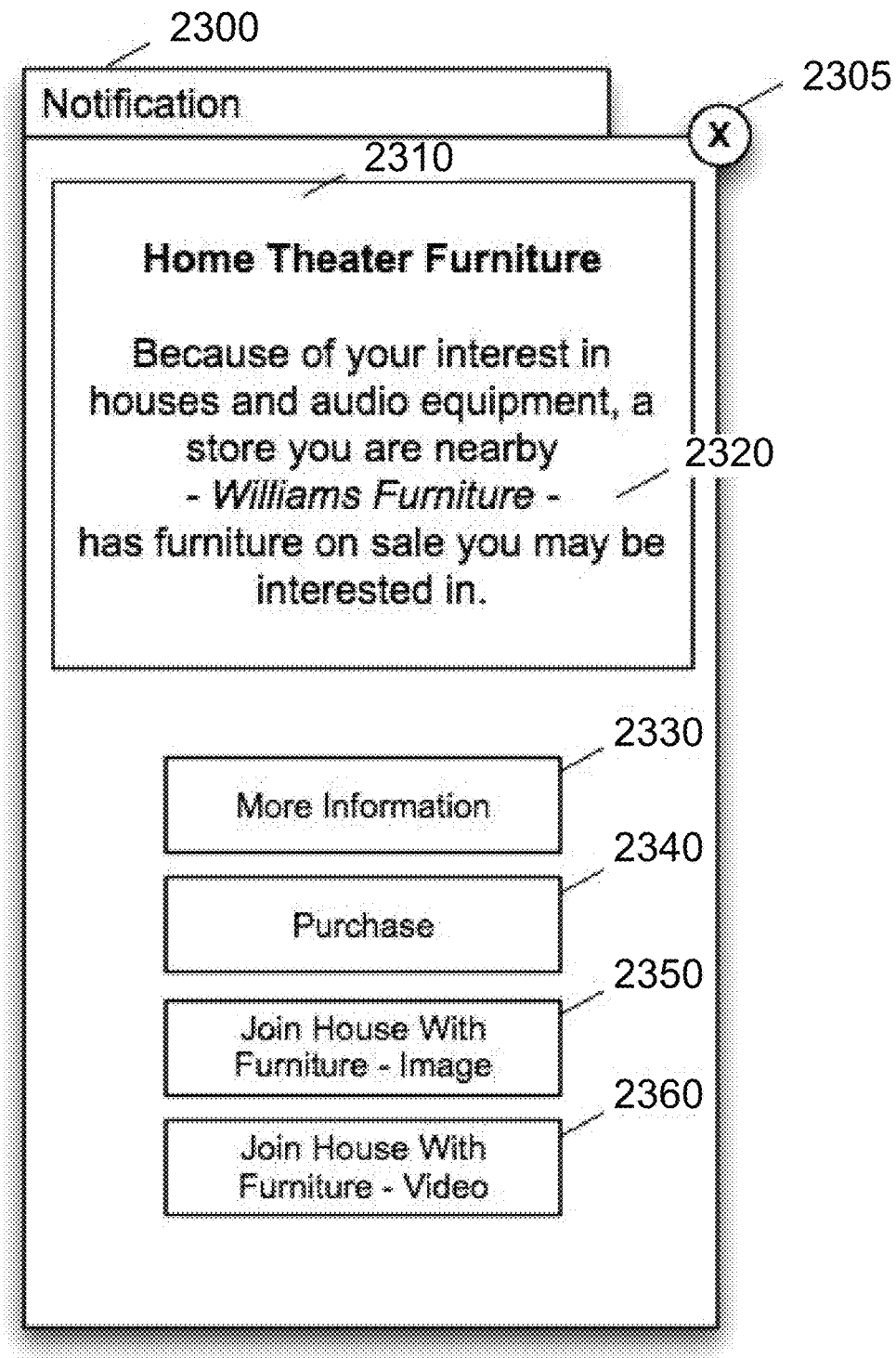
FIG. 23 illustrates an example user interface with a customized notification menu created based on a previously identified action according to example embodiments.

FIG. 23 illustrates an example user interface with a customized notification menu created based on a previously identified action according to example embodiments. Referring to FIG. 23, a possible implementation 2300 of a GUI of the application 450 depicts a notification received by the client device 18/20/22. The notification is titled "Notification" allowing the user to understand the nature of the message. This can be a title at the top of the GUI, or any other normal method regularly identified to convey the type of message that is being received on the client device 18/20/22. The message being delivered 2310 is the main part of the notification. This can include a title of message. For example, "Home Theater Furniture" signifies to the user that this message pertains to furniture. The title of the message may be made to stand out, for example a bold type. The wording of the message indicates to the user the exact nature of the message. It may give details describing the nature of why the notification is being sent to permit the user to gain an understanding of why the notification may be found of interest to the user. In this example, the message indicates that the user has previously had an interest in shopping for houses and audio equipment and therefore the system has determined that an interest may be in home theater furniture that is currently on sale in a store nearby to where the user currently is located.

The user has the option to gain further information on the store being presented in notification by selecting the name of the store 2320. The title of the store may be made to stand out further from the surrounding text by altering the style of the text, for example making it an italic format or underlining, or some other indication format that permits the user to have an indication that the store title is a selectable link.

There may be components on the GUI permitting for further interaction from the user. The button components presented 2330, 2340, 2350, 2360, 2305 are examples that serve to provide an example of the overall functionality of the interface and which may be presented to the user on the client device 18/20/22. Other interactions and GUI components may be present for permitting for further interactions without deviating from the scope of the current application.

For example, a "More Information" button 2330 may present details of the furniture items that may be of interest including price, shipping details, etc. When pressed, another window (for example, a browser application) may be presented on the client device 18/20/22 that displays the items that are available, or in another embodiment, only the items that are currently on sale. This information may be made available by interacting with the published APIs available from the store's presence on the Internet 16.

Another option may be present to permit initiating of the purchase of the item(s). A "Purchase" button 2340 is present on the GUI. The button, when pressed interacts with the business website, placing the item in the shopping cart. The website's shopping cart is presented to the user in the browser application of the client device 18/20/22. The user is able to interact with the business website to complete the purchase of the item(s). The user is able to visualize the furniture in a house that has been previously researched. This functionality permits the user to virtually place the furniture in a house that was previously researched and stored in the repository 510 and/or 12/26. In this example, the user has two options 2350 and 2360 that initiate the process. The first option "Join House With Furniture—Image" 2350 provides an image of the selected furniture with a house that has been previously researched. A second button 2360 shows a virtual video of the furniture in the chosen house.

Figure 24:
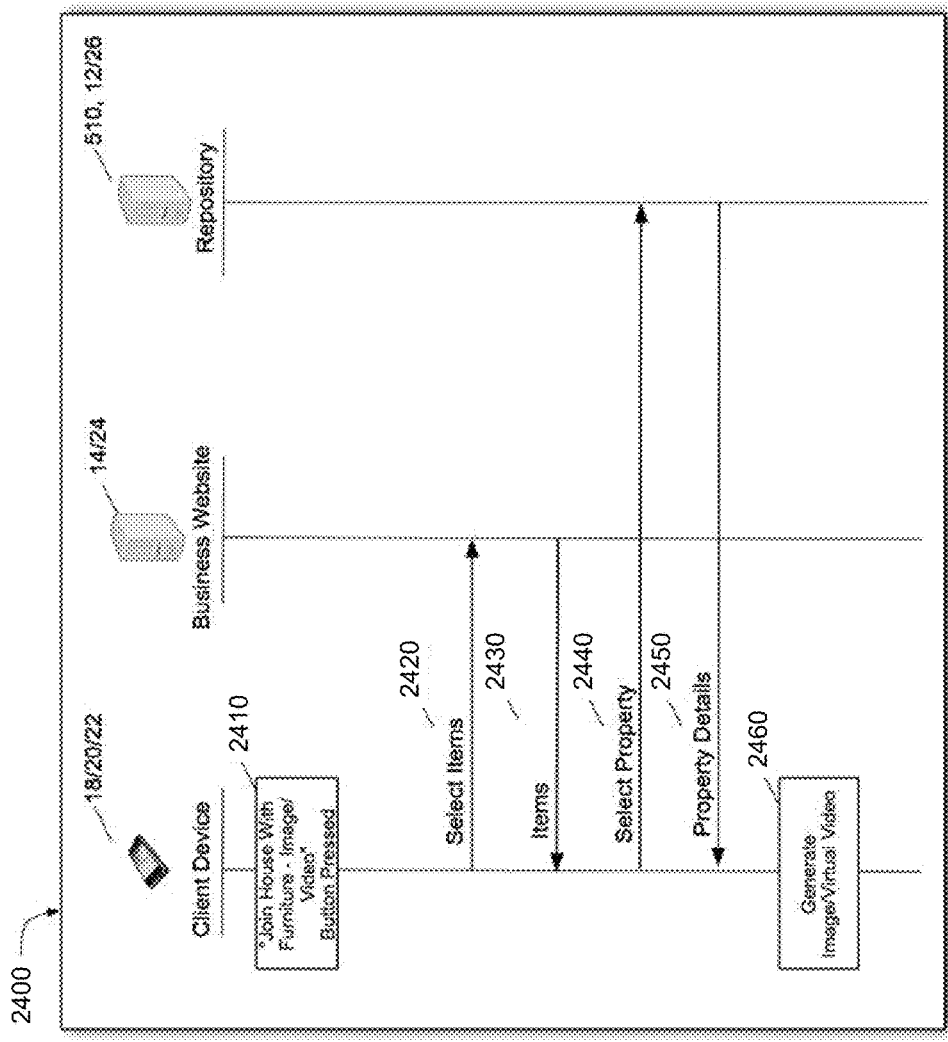
FIG. 24 illustrates an example communication system diagram of a customized content creation and sharing example according to example embodiments.

FIG. 24 illustrates an example communication system diagram of a customized content creation and sharing example according to example embodiments. Referring to FIG. 24, a possible implementation 2400 of a flowchart depicting the user selecting items to be shown in a proposed real estate property is described. In operation, the GUI component "Join House With Furniture—Image/Video" is selected on the client device 18/20/22. This enables the user to interact with the business website 14/24 through messages "Select Items" 2420 and "Items" 2430 and the user selects the furniture items from the business website. The items selected are returned to the application 450 on the client device 18/20/22. The application 450 then permits the user to select a property to "stage" the furniture. This can be a property previously selected and stored in the repository 510 and/or 12/26. A "Select Property" message 2440 is then sent to the repository, which permits the user to select a property stored in the repository. The user may be able to select from a list of properties that were previously researched by clicking on the property address (not depicted). In another example, the user may be able to select only the properties that contain media rooms.

The selected property is returned to the client device 18/20/22 via a "Property Details" message 2450. The property details contain the dimensions of the media room. In addition, other types of information may be included in the details including the color of the paint on the wall, the type and color of flooring in the media room, etc. Having both the furniture items and the details of the media room in the proposed property, the application 450 can "stage" the furniture in the media room and present it to the user. The use of virtual staging technology can be utilized to place furniture virtually in a room. Virtual staging takes a picture and/or video of a room and places pictures and/or video of furniture, which are overlaid in the room to simulate the appearance of the furniture in the room at the time of the picture and/or video. The resulting image and/or video are then presented 2460 to the user in the application 450.

In another example, if the user indicates a number of different furniture options that they like, then the application would remove properties where the furniture would not properly fit in the theater room based on size, configuration, etc. The application 450 interacts with the repository 510 and/or 12/26 to query, view, and delete the properties in the repository. If the user purchases a set of furniture, then further homes are removed from the repository 510 and/or 12/26 where the furniture would not properly fit in the theater room and/or, more homes are added and/or reordered based on this purchase. The purchase of the items is made known by the application 450 interacting with the business website and/or interacting with the published APIs of the business website.

The application 450 receives the data from one or more of the inputs and stores the data in repository(s) 510 and/or 12/26 as described above. This data can be of various formats and can be stored in a local (stored on the device 450) or remote (stored in the cloud, or network 16) database. The communication between the application 450 and the database may occur utilizing a database protocol such as the Structured Query Language (SQL), for example. Using database protocols, the application 450 may query the database to obtain previously stored content.

The application 450 can send data to the repository(s) 510 and/or 12/26 in at least two ways: live data and passive data. The details covered below attempt to cover the overall functionality of when data is sent to the repository(s) 510 and/or 12/26 as well as the types of data that can be sent in order to give the reader an overall understanding of the flow of the application by providing examples. Other types of functionality can be designed and implemented in both data formats when the data is sent and the types of data that is sent and can be easily designed and implemented without deviating from the scope of the current application.

Live data is data captured when the user performs a function in real-time either on the device 18/20/22 or outside of the device 18/20/22. For example, the user may be reading articles on-line on the device or via a magazine not on the device, watching video, listening to music, talking with a friend, messaging a friend, etc. The application 450 captures this information either automatically or when the user inputs a command to capture the data. Passive data is data that occurs when application 450 performs a function in real-time or anytime without the user initiating the function or being aware of the function being initiated, performed or completed. The passive data can occur based on at least one of a period of time, an amount of information collected, a type of information collected, a quality of information collected, a source of the information before ceasing operation, etc. The throttle of the storage of data captured through passive means is necessary to avoid the collection of thousands of articles, videos, etc. The over-abundance of data would be unable to be consumed by the user.

The application 450 can contain a configuration portion and the user is able to configure certain elements, allowing the functionality to behave as he/she sees appropriate. For example, there can be the following configuration elements in the application 450. These elements would be generally grouped together and located in a specific "configuration" section of the application easily accessible at all times by the user. Example of configuration elements may include a length of time in uploading data per event (Minutes), maximum amount of data collected per event, maximum number of files to collect per event, maximum number of bits/bytes to collect, minimum quality of video files (bit rate), maximum quality of video files (bit rate), minimum quality of audio files (bit rate), maximum quality of audio files (bit rate), maximum size of data files (MB), etc. The source of the data is from the client device 18/20/22. The configuration elements permit the user to specify specific parameters of the data that may be captured in the application 450 and help to limit the capturing of an abundance of data that is difficult to manage due to the size of data captured. The listed configuration elements serve only to exemplify the types of information that may be present in configuration the data sent to a repository(s) 510 and/or 12/26. Other similar configuration elements can be present without deviating from the scope of the current application.

The application 450 captures sound by recording the sound from a microphone of an input device 420 on the device 400. The application stores the sound in a file that is created and written locally on the device 400 or is directly uploaded to the repository(s) 510 and/or 12/26 (streamed). This data is sent to the local repository 510 and/or the remote repository 12/26. For more information regarding the sending of data to the repository, please refer to the section entitled "Storing The Data".

The application 450 captures music by storing one or more of the actual music file, or a link to the music file. When the user is either browsing a song, or viewing a video of a song and the command is received wherein the user desires to store the song in the repository(s) 510 and/or 12/26, the song file either referred to on the device 400 or a link to that song is stored in the repository 510 and/or the remote repository 12/26.

The application 450 captures messaging between the user and an acquaintance or messaging referred to on the device 400 and stores it either in the local repository 510 and/or the remote repository 12/26. In the scenario where the user is in a messaging application on the device 400, when the command is received and the user desires to store the messaging text in the repository, the text history of the conversation is sent to the local repository 510 and/or the remote repository 12/26. In another example, the application 450 retrieves additional dialogs permitting the user to select the exact portions of the conversation that are to be stored (not depicted).

In the scenario where messaging is desired to be sent to the repository(s) 510 and/or 12/26 and the user is not currently in a conversation, the user displays the conversation to be sent via the messaging application on the device 400 and provides the command to send data to either the local repository 510 and/or the remote repository 12/26. The displayed conversation is then sent to the repository(s). In another embodiment, the application 450 retrieves additional dialogs permitting the user to select the exact portions of the conversation that are to be stored (not depicted).

The application 450 captures voice via the application running on the client device 18/20/22. For example, the user can press a microphone button on the device and the application 450 controls the hardware in the device to record the verbiage. The information can be dynamically processed or stored and processed at a subsequent time. The recorded data is then automatically or not automatically loaded in the appropriate location in a folder or category on the local repository 510 and/or 12/26.

The current application stores interests of the user in at least one of a local repository 510 or a remote repository 12/26. The repository establishes categories that order the information according to type, source, ranking, and/or contents of the data. In this example, the application 450 has access to the repositories of other users in the network, and the network being all users that have used and/or are using the application 450. These different executing versions of the application 450 may interact with one another such that various insights/information can be brought to the attention of the users of the application 450 either with or without the user knowing the source of the information.

Figure 25:
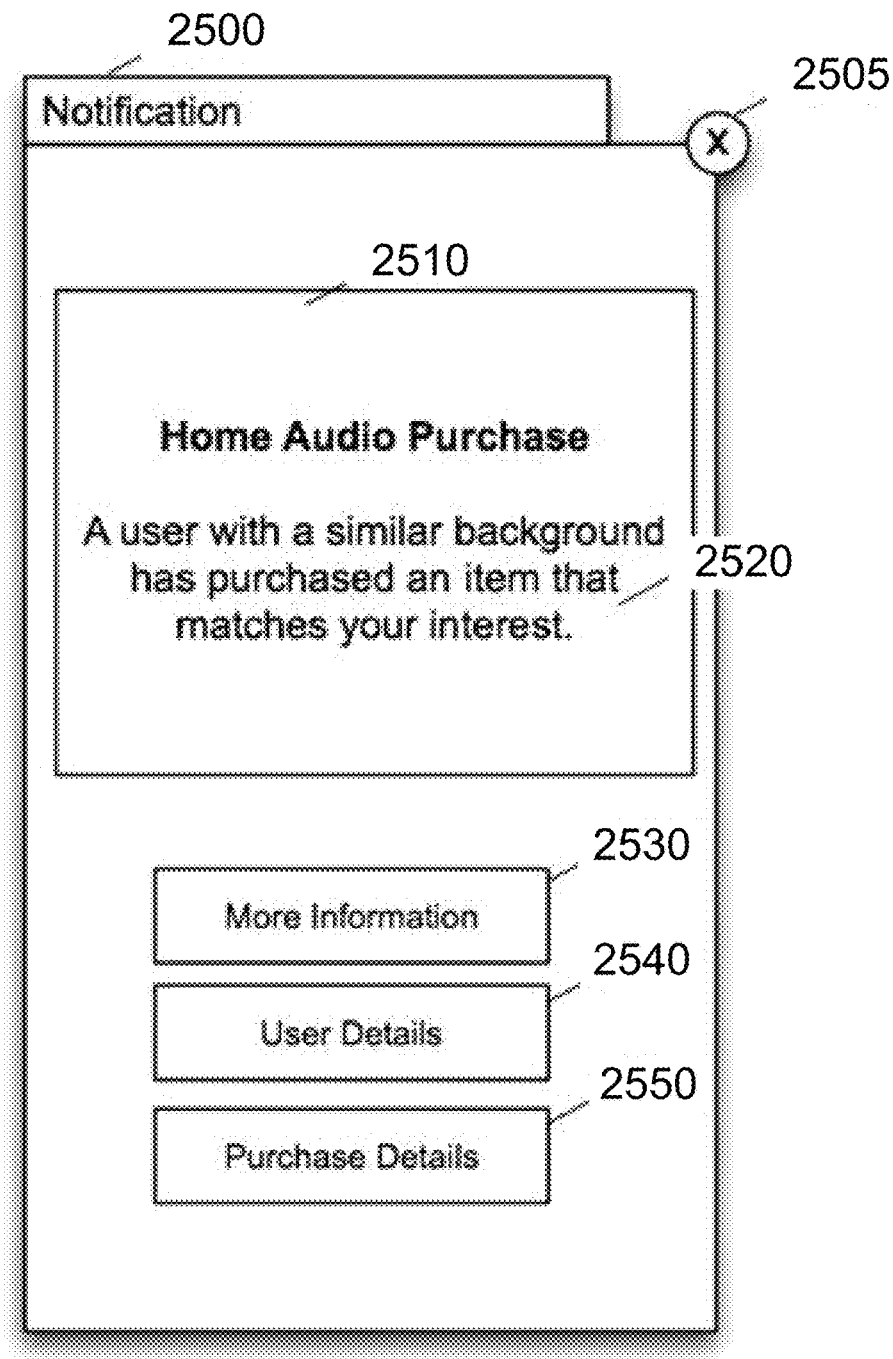
FIG. 25 illustrates another example user interface with a customized notification menu created based on a previously identified action according to example embodiments.

FIG. 25 illustrates another example user interface with a customized notification menu created based on a previously identified action according to example embodiments. Referring to FIG. 25, this interface 2500 depicts multiple users of the application 450, and multiple remote repositories. Users 'A' and 'B' are using client devices 18/20/22 to access the application 450. The client devices 18/20/22 are communicably coupled to the network 16. Each user is executing a separate instance of the application 450. The repository 'A' 12/26 is the remote repository for a user 'A' instance of the application 450, and repository 'B' 12/26 is the remote repository for a user 'B' instance of the application 450.

In one example, the system 24 is communicably coupled to the network 16 and may contain the logic that performs the merging of the data in all of the repositories of the users. In this example: repository 'A' and repository 'B'. The system 24 communicates with the application 450, which executes on the client device 18/20/22 through the network 16. Alternatively, the logic that merges the repositories 12/26 can be completely contained in the application 450 executing on the client device 18/20/22 or may be contained, fully or partially, in both the network 16 and the client device 18/20/22. Having access to the data of other users of the application 450 permits for a deeper level of interaction between the user(s) and the application 450.

In another example, the current likes, dislikes, interests, background information, geographic location, etc. of the user are also stored in the repository 510 and/or 12/26. The application 450 may provide authorization from the user permitting the user's data to be usable to other users of the application in the network or the application may use this information without authorization. This may occur during initialization of the application 450 and/or can be modified at any later time when there is either a request from an outside party to access the user's data or a desire of the user to interact with other users of the application 450. The user's personal data, such as likes, dislikes, interests, background information, geographic location, etc.) may be stored in the repository 510 and/or 12/26, or may be stored in the system 24, or any other component in the system diagram 10 by any element containing a processor, memory and operating system. The access of the personal data both the presentation of the data to other users of the application and the use of other user's personal data may assist the user in making more educated shopping decisions or wiser decisions regarding current interests in general.

In another embodiment, the application 450 interacts with one or more social networking sites to obtain interests of the user. These interests allow it to gain a more overall understanding of the user's background, interests, likes and dislikes, network of acquaintances, etc. The interaction between the application 450 and the one or more social network sites (e.g., TWITTER, FACEBOOK, LINKEDIN, etc.) is made possible through the use of published APIs from the social networking site. These APIs allow third party interactions so an application can query the social network internal data. The verification of the use of the data in the social network site usually needs prior approval from the user. This is accomplished through the configuration area of the one or more social network sites. Items in the repository (s) are ranked according to particular interests derived from user interaction with the application 450. These rankings are based on criteria, such as the number of instances where the item(s) appears in a user's repository(s). The number of instances where a user has purchased the item(s), the number of instances when a user has interacted with the business website pertaining to the item(s), the number of instances where users are in the same geographic location, the educational level of a user such that a higher ranking is assigned when the two users possess a similar educational level, the communication history between the two users such that the higher the number of times the users have spoken, the higher the ranking for the item becomes, matches that associate the regular shopping locations, etc. Other ranking criteria include, whether a remote user shops at a business that is also frequented by the user of the application 450 then it is ranked higher, the size of the users' family, the size of the users' house, the hobbies and extracurricular activities of the users, etc.

Other similar or non-similar criteria can be used to rank the items in the repository(s) 510 and/or 12/26 without deviating from the scope of the current application. The ranking of items in the repository brings a deeper level of organization to the application 450 such that items of interest are ranked not only with the data of the user who placed the items in the repository 510 and/or 12/26, but with the data of others in the "network", such as other users who use the application 450 and which have the same or similar data in their respective repositories.

The results from such a ranking provides a more organic or social aspect to the interworking of the user and the data in the repository 510 and/or 12/26. No longer is the user application simply a way to store data remotely, instead that data storage and organization may become a way to make more powerful decisions based on the likes and decisions of the user and the corresponding likes and decisions of other, such as similar users who utilize the application 450.

The system server 24, through the monitoring of the users of the application 450, may reorder the items in the list of a category of the repository(s) 510, 12/26. For example, if one or more of the users has a similar item in the present list, that item be removed from the list, added to the list, moved up in the list or moved down the list according to throttles which can be configured by the application 450. These criteria may be but are not limited to the item(s) researched or not researched by any user in the system in [#] of [days/months/years], the item(s) being purchased or not purchased by any user in the system in [#] of [days/months/years], the comments about the item(s) from other users that have purchased or used the item(s), the item(s) increase or decrease in rating by any user in the system in [#] of [days/months/years].

In a first example, there exist three users of the application 450, namely user 'A', user 'B' and user 'C'. User A is in the market for a house with existing home theaters within a predefined geographic radius (e.g., 5 miles). Users B and C are also looking for homes with existing home theaters installed in a similar geographic radius to user A. As user A researches properties and either through the speech, text or gesture action or through automatic initialization, a command is provided that permits the sending of data to the repository 510 and/or 12/26. As such, researched properties are stored in the repository 510 and/or 12/26. These properties are placed in a category reflective of their nature, for example, "Houses".

Continuing with the same example, users B and C also use the application 450 to place interesting properties into their respective repositories 510 and/or 12/26. These properties are placed in a particular category in their respective repositories 510 and/or 12/26. The system server 24 is made aware of the three users (A, B and C) containing data of a similar nature. The correlation among the users is made possible through the system server 24 having access to each of the corresponding repositories A 12/26, B 12/26 and C 12/26 through the network 24.

Users A, B and C also share data in their respective repositories 12/26. For example, data that is contained in their respective repositories 12/26 also contains audio electronics data. Therefore, the system server 24 can ascertain that the users A, B and C are all interested in the housing market and are also interested in audio/video equipment. The system server 24 notices that all three users have the same or similar categories in their respective repositories containing audio/video equipment as well as categories containing houses. This may be accomplished by the system server 24 querying the repositories (A, B and C) of each of the users and parsing through the category names. The communication between the respective repositories and the system may be performed through the network 16. The querying of the repositories can be database queries and the categories can be returned to the system 24 and compared against each other to find exact matches or similar matches. In addition to the 3 users of the application 450, it may be determined that the users share other data that is pertinent to the marriage of data from the users. Through the analysis of personal data of the users, it may be determined that all three of the users share the same education level, music tastes and similar geographic location.

Having the three users with similar interests, the system server may monitor the activities of the users. If one of the users purchases audio equipment and/or media room furniture, this provides information that the other 2 users may be interested in knowing and thus the notification procedure may be initiated upon the actions of one user to notify the other user(s). The purchase of the item(s) is made aware by the system through the presentation of the items through the application 450 and the user is able to initiate the purchase of the item(s)/product(s) through the application 450. Upon the purchase of an item, the system server 24 makes the other two users aware of the purchase and consequently raises the item in priority of the list of items if that item is listed in the respective user's repository category or adds the item to the user's list.

In one example, when a user has purchased audio equipment, the system server 24 sends a notification to the other users that either have an interest in the same category, or have that item on their list in the repository 510 and/or 12/26. The notification is titled "Notification" which permits the user to understand the nature of the message. This can be a title at the top of the GUI, or any other normal notification regularly identified to convey the type of message that is being received on the client device 18/20/22.

Referring again to FIG. 25, the message being delivered 2510 is the main part of the notification. This can include a title of a message. For example, "Home Audio Purchase" signifies to the user that this message pertains to home audio equipment. The title of the message may be made to stand out, for example a bold type or other alert mechanism. The wording of the message indicates to the user the exact nature of the message. It may give details describing the nature of why the notification is sent permitting the user to gain an understanding of why the notification may be found of interest to the user. In this example, the message indicates that a user in the system has purchased some home audio equipment and that the user has a similar background to the user.

In an alternative example, the user has the option to gain further information by selecting various parts of the message. For example, words in the message can be made to be selectable links that, when pressed, bring up a GUI component in the same application 450 or which initiate another application, for example, a browser application on the client device 18/20/22 and further details may also be displayed on the client device 18/20/22. These links can be made identified in a unique manner by having different types of indicators, for example, underlined, bold type, italic type, etc.

There may be additional components on the GUI permitting for further interaction from the user. The button components presented 2530, 2540, 2550 are examples that serve to provide an example of the overall functionality of the user interface that is presented to the user on the client device 18/20/22. Other interactions and GUI components may be present permitting for further interactions without deviating from the scope of the current application. For example, a "More Information" button 2530 may present details of the connection to the current user and the user that purchased the audio equipment. This may retrieve another GUI component listing the list of elements that the system application found when there was an identified interest between the user and the remote user. For example, the list may contain similar education, similar music styles, similar shopping styles, etc. Other types of usable information may be presented upon the clicking of the "More Information" button 2530 without deviating from the scope of the current application. This information may be made available by interacting with the published APIs available from the store's presence on the Internet 16.

Another option may be presented to permit the user to gain information of the remote user that purchased the item. This option may initiate another GUI component and the predetermined details of the remote user may be listed. In another example, there may be components permitting for the establishment of communication between the user of the application 450 and the remote user including, but not limited to: A "Call User" button, and/or A "Message User" button, etc.

A button entitled "User Details" 2540 is presented to permit the publishable details of the remote user to be viewed by the user of the application 450. This permits the user to gain an understanding of the remote user and why concern should possibly be taken with regard to the purchase of that user. A button entitled "Purchase Details" 2550 is presented to enable the details of the purchase to be viewed. This presents an additional GUI component that lists details of the purchase including but not limited to the exact item(s)

that was purchased, the business entity where the item(s) was purchased, the purchase price paid for the item(s), etc.

In addition, other components on the GUI may be present permitting the user to perform comparative shopping for the item(s). This may include a list of other brick and mortar businesses or on-line businesses that sell that particular item (either locally or not), and a link to reviews of the product by entities that review the item(s). This is made possible by the use of published APIs of the business(s). When there is interest shown in the information presented in the notification 2500 by the user interacting with one or more of the components in the GUI, the system server 24 will perform the action that either adds the purchased item(s) to the list of elements in the category of the user's repository(s) 510 and/or 12/26 if the item was not previously existing in the list or raises the ranking of the item(s) on the list.

One option on the GUI 2505 is present that permits the user to dismiss the information presented. When selected, if no other interactions have been made between the GUI window and the user, it is assumed that there is no interest and all data that may be stored in the user's repository at that time is removed. Alternatively, if the user simply ignores the notification, it is further assumed that the user is not interested in the details of the notification and all data is removed from the repository(s) 510 and/or 12/26.

In another embodiment of the present application, the system server 24 maintains a point structure so points are assigned to a user for particular user interactions. When a user interacts with another user in the network, that user is allocated points that can be redeemed for benefits. Therefore, the more that a user communicates with other users, provides ratings or connects with other users in general, that user is awarded points that can be later redeemed for benefits. The benefits can be discounts from retailers and those retailers are in partnership with the application 450 offering a discount on future purchases, discounts on shipping or other types of benefits from retailers that are of interest to the user. For example, as depicted in FIG. 25, the user may select on the "User Details" button 2540 and initiate communication with the remote user by establishing a call and/or messaging the user through the application 450. Through the establishment of the communication of the remote user, the user is awarded a certain number of points. There may be a running total of points for the user through the application's GUI.

When selecting the points total, a new GUI screen is displayed on the client device 18/20/22 displaying merchants that permit the use of points that benefit the user, for example a discount on shipping or free shipping, a percentage discount of purchased items or any other benefit that is available to the user account. In another example, additional, useful information is presented to the user that aids in assisting the user in selling a product that is being replaced. This additional information is presented to the user when the application 450 determines that the user has purchased an item or items through the application 450 or the application is otherwise aware of items the user owns either by the user providing such information to the application or by the application becoming aware of such items via the purchase of the items on-line or offline while the application is running. This is determined when a number of items exist in a single category in the repository(s) 510 and/or 12/26, for example more than 4 items.

Upon determining that the user is interested in purchasing an item or items, the application 450 and/or system 24 performs background processing that aids the user in research of the item(s). The application interacts with APIs from websites that offer goods for sale (for example CRAIGSLIST). The site queries the website looking for the item that may or may not be in the same geographical location as the user device. If found, the application 450 notifies the user that the item is for sale through the alternate website through a notification without the user attempting to locate the item.

In another embodiment, additional interactions occur that may assist the user in selling items that are being replaced. When the number of entries in a category exceeds the threshold, the application notifies the user requesting additional information.

Figure 26:
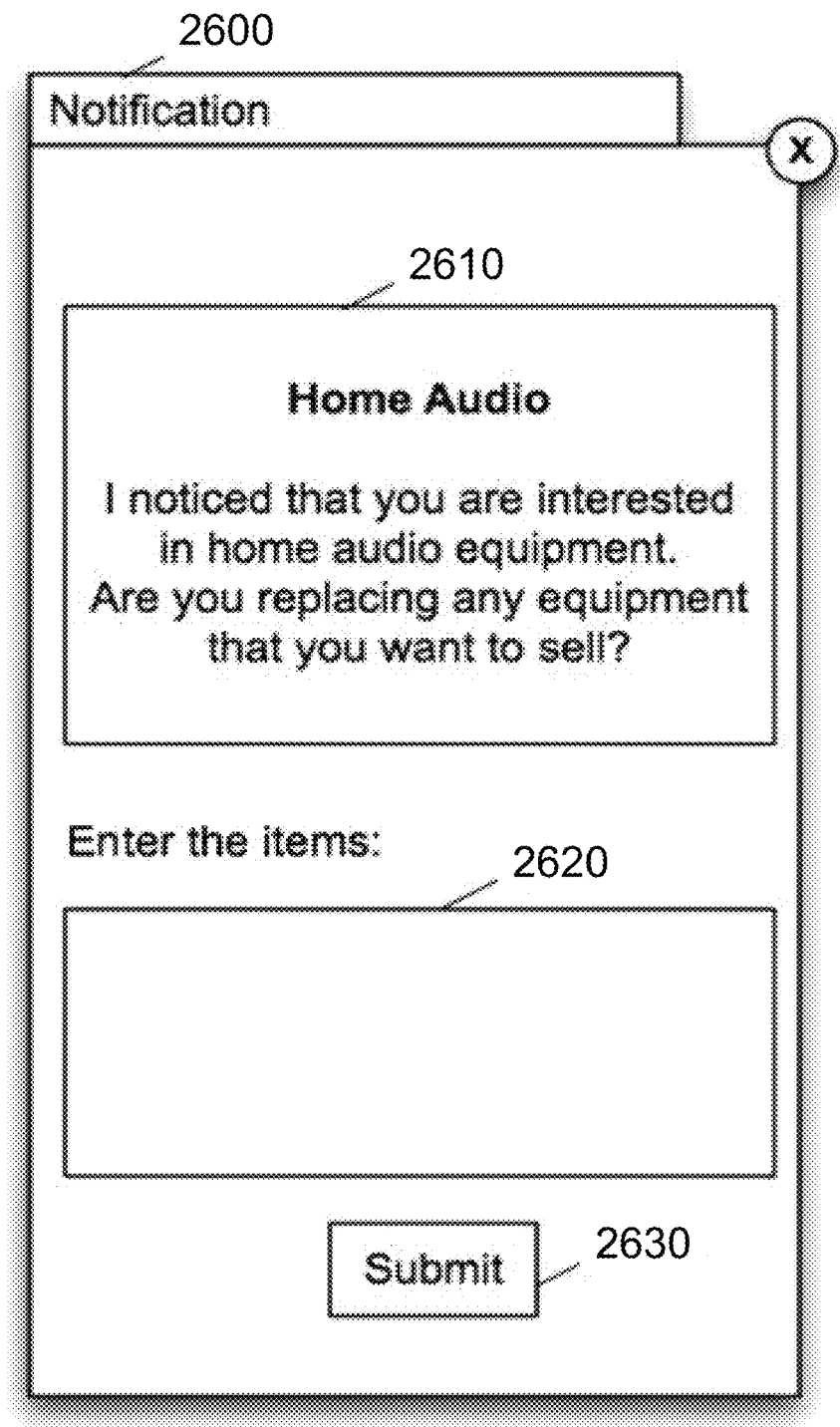
FIG. 26 illustrates yet another example user interface with a customized notification menu created based on a previously identified action according to example embodiments.

FIG. 26 illustrates yet another example user interface with a customized notification menu created based on a previously identified action according to example embodiments. Referring to FIG. 26 a possible implementation 2600 of a GUI of the application 450 depicting a notification to determine if there is an item that may be for sale to replace the item or items that the user has previously researched is illustrated. On the top portion of the notification GUI window, there is a message 2610 and the application 450 explains the nature of the message. This may include clickable links that permit the user to select and gain more information via a browser application that is executed, or another application on the user's client device 18/20/22. The links can be modified such that the user understands that the text is clickable, for example, a bold type, an italic type, an underline font, etc. There may be a text entry component 2620 and the user is permitted to enter the items that are for sale. This list can be a comma delimited list, each item listed on a separate line, or any other normally utilized method for entering a list in a text component. Images or video can be taken of the item(s) and can be analyzed by the system server 24, via various image and/or video analysis tools to determine the type of item(s). A submit button 2630 is presented at the bottom of the window and the user is able to initiate the sending of the items in the text entry component 2620 to the system server 24.

The system server 24 performs research on the received items in the list. The research determines current pricing for the items listed which may include the price that the items currently list for, and what the actual sold price, if any, was for a recent transaction. This is accomplished through interactions with online sites that sell used products such as CRAIGSLIST, EBAY, or any other similar sales sites. The application 450 interacts with published APIs of the websites to gain information regarding the products for sale. The user receives notification from the system server 24 regarding any items where the details of the current market value, sites that offer to host the product, etc., which are found.

Figure 27:
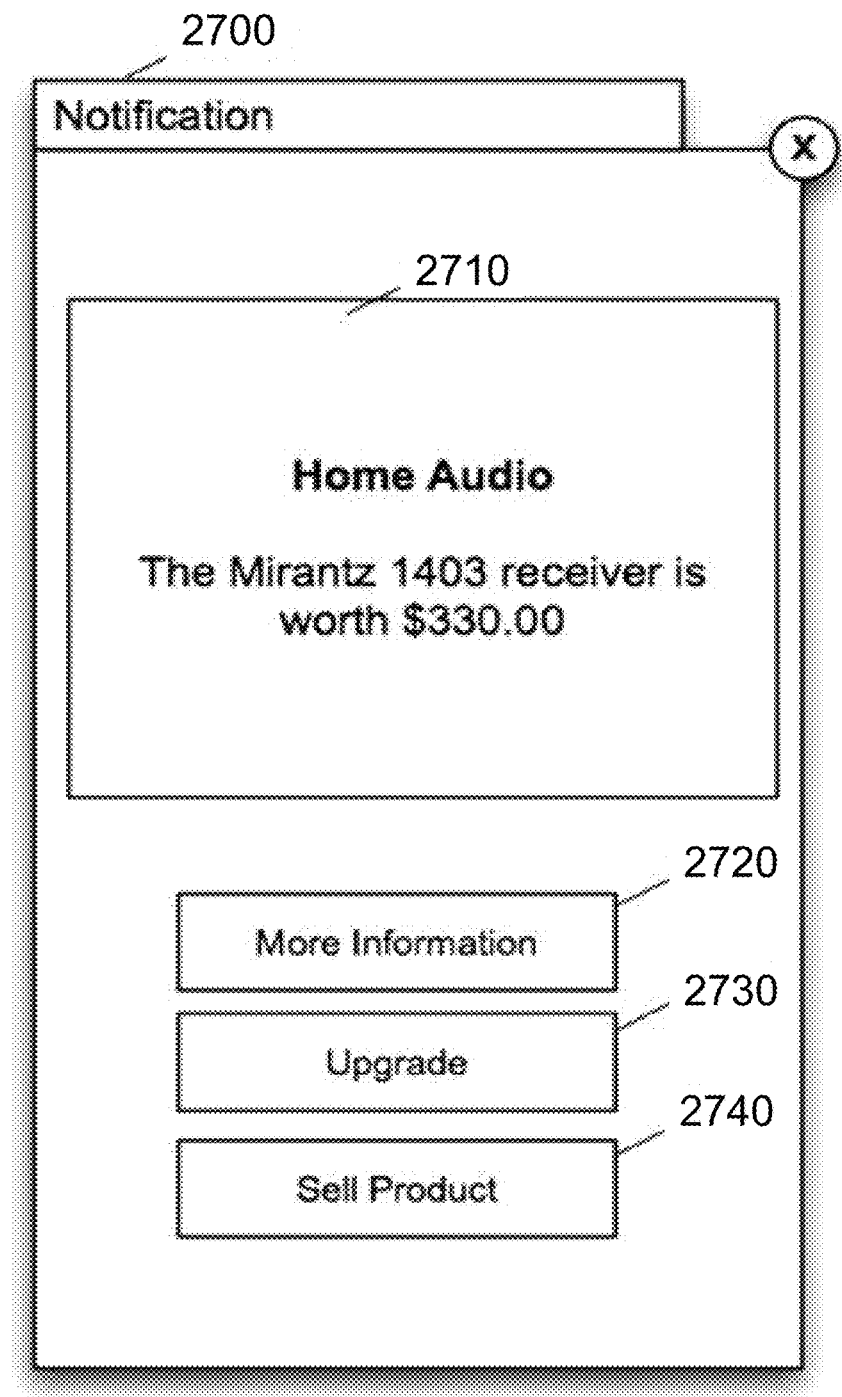
FIG. 27 illustrates still yet another example user interface with a customized notification menu created based on a previously identified action according to example embodiments.

FIG. 27 illustrates still yet another example user interface with a customized notification menu created based on a previously identified action according to example embodiments. FIG. 27 illustrates a possible implementation 2700 of a GUI of the application 450 depicting details of a product that the user may be interested in selling. On the top of the notification GUI window, there may be a message 2710 and the application 450 explains the nature of the message. This may include selectable links that permit the user to click and gain more information via a browser application that is executed, or another application on the user's client device 18/20/22. The links can be modified such that the user understands that the text is selectable, for example a bold type, an italic type, an underline font, etc.

The message may indicate the product model and the value as determined by interacting with the published APIs of sites that sell that product. This may include the price for the product that is new and/or the price for a used product.

In addition, buttons exist on the GUI 2720, 2730, 2740 that permit for further interactions. A "More Information" button 2720 is present that, when select, can initiate a browser application and display the website that shows the product for sale (either a new product or a used product). An "Upgrade" button 2730 is present that, when selected, initiates another GUI window (not depicted) providing details of any new models that replaced the model for sale, the prices of the line of models from the manufacturer, the local and online retailers that offer the product for sale and other similar information. A "Sell Product" option 2740 is present that, when pressed, initiates a browser window that permits the user to input information to place the item for sale. This is accomplished by interworking with sites that sell used products, for example AMAZON, CRAIGSLIST and/or EBAY.

Figure 28:
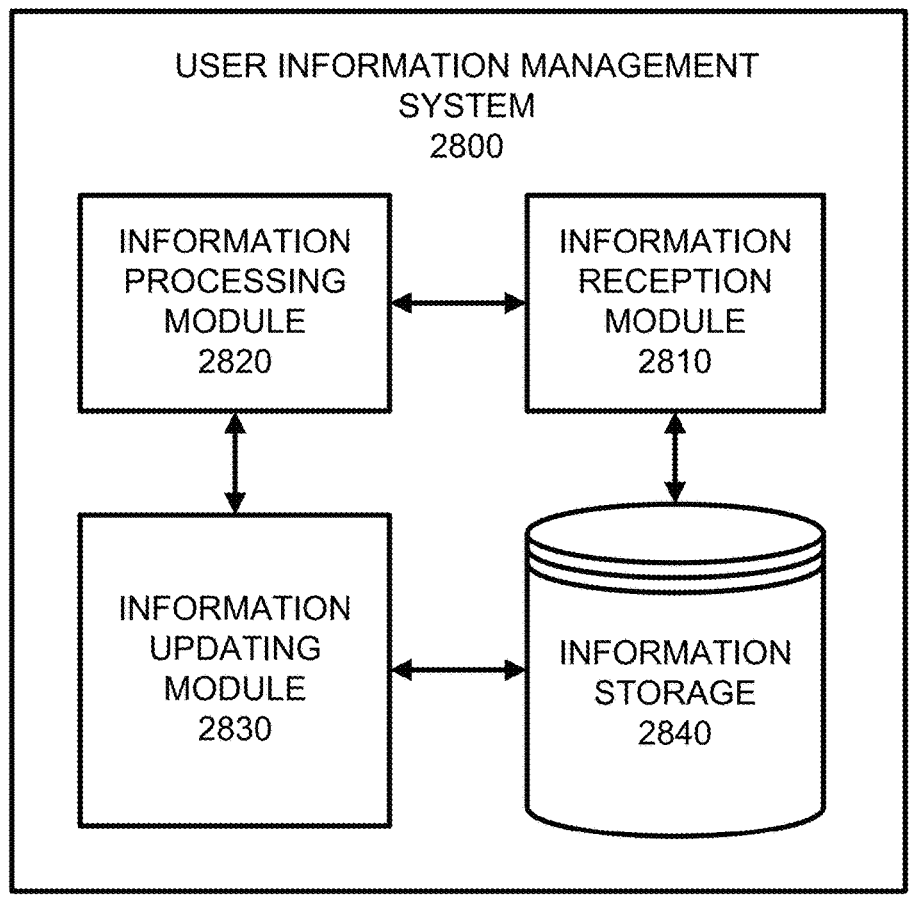
FIG. 28 illustrates a system configuration configured to perform one or more of the example embodiments of the present application.

FIG. 28 illustrates a system configuration configured to perform one or more of the example embodiments of the present application. Referring to FIG. 28, the user information management system 2800 may be a module or device(s) that is configured to perform any of the above-noted operations. For instance, the system 2800 may include an information reception module 2810 that receives information as user data is accumulated based on identified queries, interests or other actions that cause information to be receive and logged in accordance with a user account. The information processing module 2820 is responsible for retrieving the user information stored in memory 2840 and attempting to create user suggestions, notifications and perform subsequent processing operations based on the known user initiated operations. The information update module 2830 is responsible for storing in memory the user actions and changes to user information that may occur from known user actions, preferences and current interests.

One example method of operation performed by system 2800 may include assigning weights to user interests for subsequent querying and user results. The operation may include retrieving first user data from a memory location, assigning a category to the first user data based on a memory location of the first user data and/or a context of the first user data. The operation may also include applying a weight to the first user data based on the category assigned to the first user data and/or the memory location, and assigning the weighted first user data to a user interest log for subsequent reference purposes. The source of the memory location may be a local memory and/or a remote memory. In one example, the weight may be applied to the first user data by weighting the first user data higher when the first user data is retrieved from a local memory. In another example, applying the weight to the first user data may include weighting the first user data lower when the first user data is retrieved from a remote memory or vice versa. Also, applying the weight to the first user data may provide weighting the first user data higher when a timestamp associated with the first user data is a recent timestamp. Also, in another example, a first weight of the first user data is retrieved from a local memory and a second weight of the first user data is retrieved from a remote memory, and the first weight and the second weight are added together to generate a combined weighted first user data, and the combined weighted may be applied to the first user data of the user interest log. This provides an opportunity to use the weighted user data to provide better query results.

In another example, various information sources are identified for user trends, such as frequent search terms and other terms and phrases that are parsed and applied to the current interests of the user for subsequent search efforts and purchase products, etc. Also, the information source may be weighted based on its predetermined weighting factor, email data vs. social networking data, etc. An example method of operation may include identifying at least one information source stored in a memory location and parsing at least one word from the information source. Next, a category may be assigned to the word, and a set of current interests may be updated to include the category. Also, a number of information sources recently accessed via a user device may be identified along with a number of words respectively associated with the information sources. At least one trend associated with the plurality of words may be determined and the set of current interests may be updated to include the new trend. The updated set of current interests may be applied to at least one action such as submitting a query or updating a user interface/dashboard. The results may include a suggested phrase for a query and a suggested item for purchase, which are presented to the user device. The word parsed from the information source may include parsing words from different information sources, comparing the words to identify a trend among the words, associating the trend with the category, and updating the set of current interests to include the trend. The information source may include various information sources and at one of the information sources may be assigned a higher weighting factor than other ones of the information sources. The weight may be applied to the category based on the weighting factor of the information source where the word was identified.

According to another example embodiment, previous search efforts may be stored and applied to a current search effort as supported by FIGS. 20 and 21. For instance, a home speaker sound device search effort may be applied to a home search to find homes with pre-installed surround sound, the result would modify a user interface with results based on those interests identified.

In one specific example, an operation may include identifying a most recent interest from user device submitted data. Next, a database may be searched for instances of the most recent interest and a new category may be created based on the most recent interest identified. The new category may be stored in memory and the new category may be combined with query search terms and submitted as a combined query. Combined query results may be received and used to create a modified user interface based on the results of the combined query. A most recent interest may be identified by processing recent query terms associated with a user account and matching at least one of the query terms to the new category. The operations may also include filtering the results of the query to include filtered results that match the combined query. A new table parameter may be added to existing table parameters of a table included in the user interface to include the new category, and the new and existing table parameters may be populated with the results of the combined query. The new table parameter may be assigned as a main table topic category and the existing table parameters can be assigned as sub-topics under the main table topic category. Alias keyword terms may be created from the most recent interest, and applied as keyword terms to the combined query. A third party website application programming interface may be accessed and used to apply the alias keyword terms to content included in the application programming interface, and the table may be populated with relevant content retrieved from the application programming interface.

Another example embodiment may include capturing an image of a user location and applying products and interests to a notification scenario to inform the user what is available with reference to FIG. 22. One example method of operation may include capturing present media content associated with a user device, processing the captured present media content to identify a present location of a user device, retrieving user interests and performing a query based on the user interests and the present location of the user, creating a notification comprising a nearby facility that is associated with the present location and user interests, and transmitting the notification to the user device. Additional operations may provide identifying at least one retail location associated with the present location of the user device, retrieving product inventory associated with the at least one retail location, and incorporating the product inventory into the notification.

The user interests may be applied to the product inventory to identify at least one product of interest that matches the user interests, and as a result, the product of interest may be incorporated into the notification. The user interests may be based on queries performed by the user device prior to the present media content being captured. The present media content includes one or more of an image, a video and an audio segment that is captured via the user device. Processing the media content includes comparing the media content to a database of known media content to identify at least one retail location. The user interests may be associated with a number of keywords used to match at least one product of interest and the plurality of keywords can be compared to product inventory associated with the retail location, and at least one product of interest from the product inventory can then be identified.

According to another example embodiment, identifying products of interest and staging them in a house may be performed virtually to entice user interest. The example may include identifying at least one current user interest and applying the at least one user interest to a product query, generating the product query and transmitting the product query to at least one product source. As a result, a plurality of products correlating to the at least one current user interest may be generated responsive to the product query being transmitted, and at least one of the plurality of products may be incorporated into a predefined user interest model, such as a media file depicting a room. The plurality of products may be imported into the room to create a modified media file. The modified media file may be transmitted to a user device, and displayed for user approval. Stored user data may be retrieved from a user repository and used to identify at least one property from a user submitted query, and the plurality of products may be applied to the at least one property as the user interest model. At least one attribute may be applied and associated with the at least one property to the plurality of products, and it is determined whether the plurality of products are compatible with the property, and the products may be applied to the property when the plurality of products are identified to be compatible with the property. Determining whether the products are compatible with the property may include identifying measurements corresponding to the various products and comparing the measurements corresponding to the products to measurements corresponding to the property.

Another example embodiment may include a user's actions and interests being correlated with others' interests and providing options to the user based on the cross-correlation. For example, one example operation may include receiving at least one first action from a first user device, storing the first action in a first data repository, receiving a second action from a second user device, storing the second action in a second data repository, and creating a notification and transmitting the notification to the first user device and the second user device responsive to receiving one of the first user action and the second user action.

The first action may be a product purchase and/or query. The second user action may be at least one of a product purchase and a query that includes information similar to the first action. Other operations may include retrieving personal information associated with a user of the first user device and a user of the second user device, the personal information includes current likes, current dislikes, interests, and geographic location information associated with the first user device and the second user device. Other operations may include generating one or more suggestion actions and applying the personal information to the suggestion actions, and incorporating the suggestion action in the notification. The suggestion action may include at least one of a product for purchase and a store location. A similarity between the first user action and the second user action may then be identified.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 29 illustrates an example network element 2900, which may represent any of the above-described network components, etc.

Figure 29:
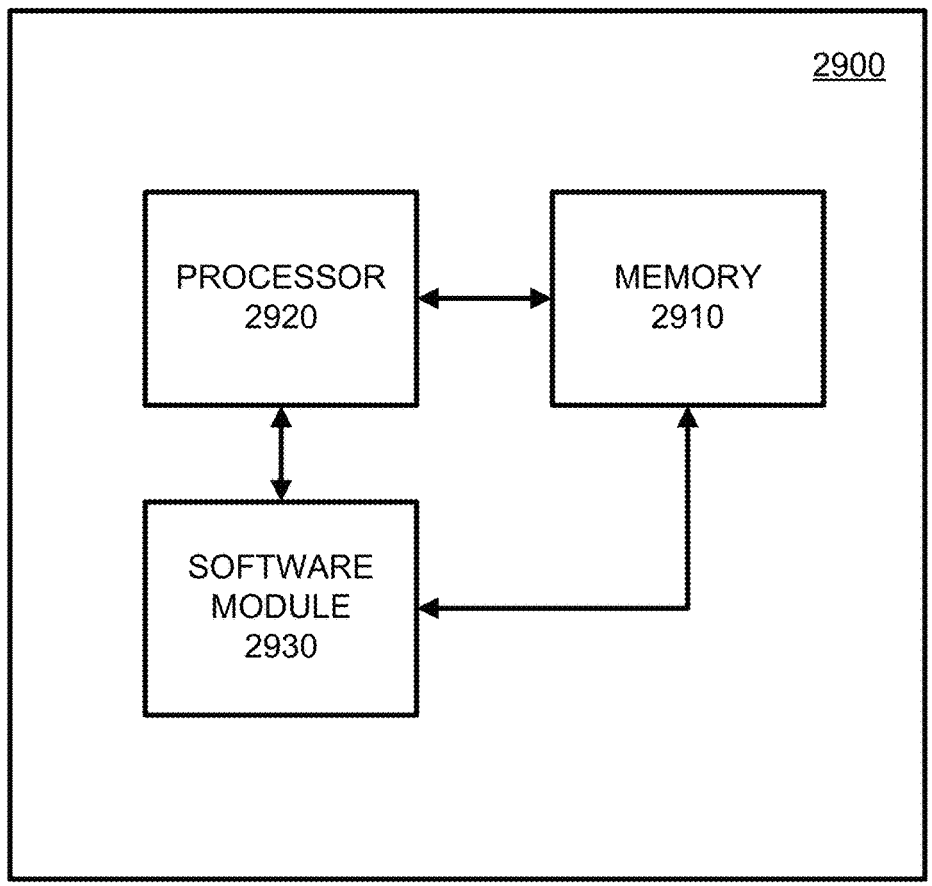
FIG. 29 illustrates an example network entity device configured to store instructions, software, and corresponding hardware for executing the same, according to example embodiments of the present application.

As illustrated in FIG. 29, a memory 2910 and a processor 2920 may be discrete components of the network entity 2900 that are used to execute an application or set of operations. The application may be coded in software in a computer language understood by the processor 2920, and stored in a computer readable medium, such as, the memory 2910. The computer readable medium may be a non-transitory computer readable medium that includes tangible hardware components in addition to software stored in memory. Furthermore, a software module 2930 may be another discrete entity that is part of the network entity 2900, and which contains software instructions that may be executed by the processor 2920. In addition to the above noted components of the network entity 2900, the network entity 2900 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 28 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving at least one first action as a voice command from a first user device comprising a first data repository;
   storing the at least one first action in a first category in the first data repository;
   receiving at least one second action as a first air gesture from a second user device comprising a second data repository, air gestures comprising user movements in front of a user device display;
   ignoring all other air gestures, except for an overriding gesture, for a predetermined time period after receiving the first air gesture;
   in response to receiving the overriding gesture as a second air gesture during the predetermined time period:
   permitting receipt of another of at least one second action as a third air gesture from the second user device comprising the second data repository;
   storing the other of at least one second action in a second category in the second data repository, the first and second data repositories organized into default categories defined by other users different than users of the first and second user devices; and
   creating a notification and transmitting the notification to at least one of the first user device and the second user device responsive to receiving at least one of the at least one first action and the at least one second action.

2. The method of claim 1, wherein the at least one first action is at least one of a product purchase and a query.

3. The method of claim 2, wherein the at least one second action is at least one of a product purchase and a query that comprises information similar to the at least one first action.

4. The method of claim 1, further comprising:
   retrieving personal information associated with at least one of a user of the first user device and a user of the second user device, the personal information comprising at least one of current likes, current dislikes, interests, and geographic location information associated with at least one of the first user device and the second user device.

5. The method of claim 4, further comprising:
generating at least one suggestion action and applying the personal information to the suggestion action; and
incorporating the at least one suggestion action in the notification.

6. The method of claim 5, wherein the at least one suggestion action comprises at least one of a product for purchase and a store location.

7. The method of claim 1, further comprising:
identifying at least one similarity between the at least one first action and the at least one second action.

8. An apparatus comprising:
a receiver configured to receive at least one first action as a voice command from a first user device comprising a first data repository; and
a processor configured to store the at least one first action in a first category in the first data repository, and
wherein the receiver is also configured to receive at least one second action as a first air gesture from a second user device comprising a second data repository, air gestures comprising user movements in front of a user device display; and
wherein the processor is further configured to ignore all other air gestures, except for an overriding gesture, for a predetermined time period after the processor receives the first air gesture;
in response to the processor receiving the overriding gesture as a second air gesture during the predetermined time period, the processor:
permits receipt of another of at least one second action as a third air gesture from the second user device comprising the second data repository;
stores the other of at least one second action in a second category in the second data repository, the first and second data repositories organized into default categories defined by other users different than users of the first and second user devices, and
creates a notification and transmits the notification to at least one of the first user device and the second user device responsive to receiving at least one of the at least one first action and the at least one second action.

9. The apparatus of claim 8, wherein the at least one first action is at least one of a product purchase and a query.

10. The apparatus of claim 9, wherein the at least one second action is at least one of a product purchase and a query that comprises information similar to the at least one first action.

11. The apparatus of claim 8, wherein the processor is further configured to retrieve personal information associated with at least one of a user of the first user device and a user of the second user device, the personal information comprising at least one of current likes, current dislikes, interests, and geographic location information associated with at least one of the first user device and the second user device.

12. The apparatus of claim 11, wherein the processor is further configured to generate at least one suggestion action and applying the personal information to the suggestion action, and incorporate the at least one suggestion action in the notification.

13. The apparatus of claim 12, wherein the at least one suggestion action comprises at least one of a product for purchase and a store location.

14. The apparatus of claim 8, wherein the processor is further configured to identify at least one similarity between the at least one first action and the at least one second action.

15. A non-transitory computer readable storage medium configured to store instructions that when executed cause a processor to perform:
receiving at least one first action as a voice command from a first user device comprising a first data repository;
storing the at least one first action in a first category in the first data repository;
receiving at least one second action as a first air gesture from a second user device comprising a second data repository, air gestures comprising user movements in front of a user device display;
ignoring all other air gestures, except for an overriding gesture, for a predetermined time period after receiving the first air gesture;
in response to receiving the overriding gesture as a second air gesture during the predetermined time period:
permitting receipt of another of at least one second action as a third air gesture from the second user device comprising the second data repository;
storing the other of at least one second action in a second category in the second data repository, the first and second data repositories organized into default categories defined by other users different than users of the first and second user devices; and
creating a notification and transmitting the notification to at least one of the first user device and the second user device responsive to receiving at least one of the at least one first action and the at least one second action.

16. The non-transitory computer readable storage medium of claim 15, wherein the at least one first action is at least one of a product purchase and a query.

17. The non-transitory computer readable storage medium of claim 16, wherein the at least one second action is at least one of a product purchase and a query that comprises information similar to the at least one first action.

18. The non-transitory computer readable storage medium of claim 15, wherein the processor is further configured to perform:
retrieving personal information associated with at least one of a user of the first user device and a user of the second user device, the personal information comprising at least one of current likes, current dislikes, interests, and geographic location information associated with at least one of the first user device and the second user device.

19. The non-transitory computer readable storage medium of claim 18, wherein the processor is further configured to perform:
generating at least one suggestion action and applying the personal information to the suggestion action; and
incorporating the at least one suggestion action in the notification.

20. The non-transitory computer readable storage medium of claim 19, wherein the at least one suggestion action comprises at least one of a product for purchase and a store location.

* * * * *